(12) United States Patent
Hunter et al.

(10) Patent No.: US 7,674,095 B2
(45) Date of Patent: Mar. 9, 2010

(54) VARIABLE DISPLACEMENT VANE PUMP WITH VARIABLE TARGET REGULATOR

(75) Inventors: Douglas G. Hunter, Shelby Township, MI (US); Thomas Haase, Rosbach (DE)

(73) Assignee: BorgWarner Inc., Auburn Hills, MI (US)

( * ) Notice: Subject to any disclaimer, the term of this patent is extended or adjusted under 35 U.S.C. 154(b) by 1500 days.

(21) Appl. No.: 10/959,803

(22) Filed: Oct. 6, 2004

(65) Prior Publication Data

US 2005/0129528 A1    Jun. 16, 2005

Related U.S. Application Data

(63) Continuation-in-part of application No. 10/192,578, filed on Jul. 10, 2002, now Pat. No. 6,790,013, and a continuation-in-part of application No. 10/021,566, filed on Dec. 12, 2001, now Pat. No. 6,896,489.

(60) Provisional application No. 60/510,222, filed on Oct. 10, 2003, provisional application No. 60/304,604, filed on Jul. 11, 2001, provisional application No. 60/255,629, filed on Dec. 12, 2000.

(51) Int. Cl.
*F04B 49/00* (2006.01)
*F04C 29/02* (2006.01)
(52) U.S. Cl. .................. 417/220; 417/310; 418/26; 418/30
(58) Field of Classification Search .............. 417/199.1, 417/212, 218, 220, 221, 410.3, 306, 310, 417/311; 418/26, 27, 29, 30
See application file for complete search history.

(56) References Cited

U.S. PATENT DOCUMENTS 2,716,946 A   9/1955  Hardy
3,011,308 A  12/1961  Wotring (Continued)

FOREIGN PATENT DOCUMENTS

CA        23 85 897       11/2003

(Continued)

*Primary Examiner*—Devon C Kramer
*Assistant Examiner*—Leonard J Weinstein
(74) *Attorney, Agent, or Firm*—Warn Partners, P.C.

(57) ABSTRACT

A variable displacement vane-type fluid pump is provided which permits improved regulation of the pump discharge such that the pump can meet the various requirements of lubrication for internal combustion engines at all speeds with minimized use of power. Of course, the vane pump may also be utilized in a wide range of power transmission and other fluid distribution applications. The vane pump of the invention may also use both hydrostatic and mechanical actuators to control the position of its containment ring or eccentric ring and hence, regulate the output of the pump. According to yet another aspect of the present invention, to prevent inlet flow restriction or cavitation, a valve may be provided to permit some of the pump outlet or discharge flow to bleed into the pump inlet to provide needed velocity energy to the fluid flow into the pump inlet. A system for lubrication of an engine using a fixed displacement pump for providing an engine speed input for controlling a second main variable displacement type oil pump and maintaining a target oil pressure in the oil pressure circuit. A solenoid valve is used for venting output of the fixed displacement pump to create a second target oil pressure characteristic or curve when desired.

16 Claims, 17 Drawing Sheets

U.S. PATENT DOCUMENTS

| | | |
|---|---|---|
| 3,204,859 A | 9/1965 | Crooks |
| 3,732,036 A * | 5/1973 | Busbey et al. ............... 417/216 |
| 3,771,921 A | 11/1973 | Rohde et al. |
| 3,918,855 A | 11/1975 | Bornholdt |
| 3,973,881 A | 8/1976 | Melchinger |
| 4,014,305 A | 3/1977 | Skinner |
| 4,035,105 A * | 7/1977 | Dantlgraber ............... 417/220 |
| 4,222,718 A | 9/1980 | Lemke |
| 4,236,595 A | 12/1980 | Beck et al. |
| 4,259,039 A | 3/1981 | Arnold |
| 4,292,805 A | 10/1981 | Acheson |
| 4,325,215 A * | 4/1982 | Yamamoto .................. 60/450 |
| 4,328,480 A | 5/1982 | Keitel et al. |
| 4,342,545 A * | 8/1982 | Schuster ...................... 418/26 |
| 4,348,159 A | 9/1982 | Acheson |
| 4,369,743 A | 1/1983 | Holt et al. |
| 4,378,200 A * | 3/1983 | Edwards et al. ............. 417/216 |
| 4,450,818 A | 5/1984 | Thoma et al. |
| 4,468,173 A | 8/1984 | Dantlgraber |
| 4,496,288 A | 1/1985 | Nakamura et al. |
| 4,510,962 A | 4/1985 | Mott et al. |
| 4,531,706 A | 7/1985 | Weiger et al. |
| 4,531,898 A | 7/1985 | Ideta |
| 4,538,974 A | 9/1985 | Stich et al. |
| 4,632,638 A | 12/1986 | Shibayama et al. |
| 4,693,081 A | 9/1987 | Nakamura et al. |
| 4,710,106 A | 12/1987 | Iwata et al. |
| 4,738,330 A | 4/1988 | Suzuki et al. |
| 4,740,142 A | 4/1988 | Rohs et al. |
| 4,754,738 A | 7/1988 | Grohn et al. |
| 4,774,918 A | 10/1988 | Kurio et al. |
| 4,803,969 A | 2/1989 | Hiereth et al. |
| 4,825,692 A | 5/1989 | Rohs et al. |
| 4,850,269 A | 7/1989 | Hancock et al. |
| 4,905,807 A | 3/1990 | Rohs et al. |
| 4,974,562 A | 12/1990 | Ishii et al. |
| 4,976,230 A | 12/1990 | Voigt |
| 5,017,098 A | 5/1991 | Hansen et al. |
| 5,052,896 A | 10/1991 | Fischer et al. |
| 5,063,895 A | 11/1991 | Ampferer |
| 5,067,454 A | 11/1991 | Waddington et al. |
| 5,078,233 A | 1/1992 | Oetting et al. |
| 5,085,187 A | 2/1992 | Black |
| 5,090,881 A | 2/1992 | Suzuki et al. |
| 5,101,789 A | 4/1992 | Voigt et al. |
| 5,105,679 A | 4/1992 | Voigt |
| 5,141,418 A | 8/1992 | Ohtaki et al. |
| 5,190,003 A | 3/1993 | Voigt |
| 5,195,474 A | 3/1993 | Urata et al. |
| 5,239,885 A | 8/1993 | Voigt |
| 5,273,020 A | 12/1993 | Hayami |
| 5,315,971 A | 5/1994 | Yamada |
| 5,339,776 A | 8/1994 | Regueiro |
| 5,353,753 A | 10/1994 | McGrath et al. |
| 5,355,851 A | 10/1994 | Kamiya |
| 5,390,635 A | 2/1995 | Kidera et al. |
| 5,398,505 A | 3/1995 | Oogushi et al. |
| 5,404,855 A | 4/1995 | Yen et al. |
| 5,435,698 A | 7/1995 | Phillips |
| 5,465,699 A | 11/1995 | Voigt |
| 5,467,843 A | 11/1995 | Esch et al. |
| 5,484,271 A | 1/1996 | Stich |
| 5,485,725 A | 1/1996 | Teraoka |
| 5,490,770 A * | 2/1996 | Oogushi ...................... 418/27 |
| 5,544,628 A | 8/1996 | Voigt |
| 5,545,014 A | 8/1996 | Sundberg et al. |
| 5,545,018 A | 8/1996 | Sundberg |
| 5,588,504 A | 12/1996 | Spiegel et al. |
| 5,618,165 A | 4/1997 | Larsson et al. |
| 5,630,383 A | 5/1997 | Kidera et al. |
| 5,690,479 A | 11/1997 | Lehmann et al. |
| 5,752,815 A | 5/1998 | Muller |
| 5,797,732 A | 8/1998 | Watanabe et al. |
| 5,800,131 A | 9/1998 | Lehmann et al. |
| 5,826,556 A | 10/1998 | Ruman et al. |
| 5,863,189 A | 1/1999 | Sundberg et al. |
| 5,876,185 A * | 3/1999 | Schimpf et al. ............. 417/213 |
| 5,904,126 A | 5/1999 | McKay et al. |
| 5,918,573 A | 7/1999 | Killion |
| 5,921,758 A | 7/1999 | Anamoto et al. |
| 5,996,541 A | 12/1999 | Voigt et al. |
| 6,053,137 A | 4/2000 | Trzmiel et al. |
| 6,065,433 A | 5/2000 | Hill |
| 6,079,380 A | 6/2000 | Jorgensen et al. |
| 6,131,539 A | 10/2000 | Thomas |
| 6,155,797 A | 12/2000 | Kazuyoshi |
| 6,202,016 B1 * | 3/2001 | Stephenson et al. ........... 701/51 |
| 6,216,651 B1 | 4/2001 | Ishikawa et al. |
| 6,408,975 B1 | 6/2002 | Bishop et al. |
| 6,488,479 B1 | 12/2002 | Berger |
| 6,524,076 B2 | 2/2003 | Konishi |
| 6,615,683 B1 | 9/2003 | Voigt |
| 6,669,439 B2 | 12/2003 | Kardasz et al. |
| 2001/0036412 A1 | 11/2001 | Konishi |
| 2003/0031567 A1 | 2/2003 | Hunter et al. |
| 2003/0231965 A1 * | 12/2003 | Hunter et al. ............... 417/212 |

FOREIGN PATENT DOCUMENTS

| | | |
|---|---|---|
| DE | 32 304 32 | 2/1984 |
| DE | 32 386 50 | 4/1984 |
| DE | 34 466 03 | 7/1985 |
| DE | 36 217 20 | 1/1987 |
| DE | 37 117 92 | 10/1987 |
| DE | 37 295 45 | 3/1988 |
| DE | 37 423 15 | 7/1988 |
| DE | 38 243 98 | 2/1989 |
| DE | 38 40 909 | 6/1989 |
| DE | 39 25 249 | 3/1990 |
| DE | 43 02 610 | 1/1993 |
| DE | 42 42 871 | 6/1994 |
| DE | 44 44 819 | 6/1996 |
| DE | 101 41 786 | 3/2003 |
| DE | 101 44 693 | 3/2003 |
| DE | 40 38 549 | 7/2003 |
| DE | 102 37 801 | 7/2003 |
| EP | 1 076 164 | 2/2001 |
| EP | 1 130 262 | 9/2001 |
| EP | 1 316 683 | 6/2003 |
| EP | 1 350 930 | 10/2003 |
| FR | 2 597 546 | 10/1987 |
| FR | 2 673 676 | 9/1992 |
| JP | 62 294 790 | 12/1987 |
| JP | 06 146882 | 5/1994 |
| JP | 8 14164 | 1/1996 |
| JP | 2001 159395 | 6/2001 |
| JP | 2001 173575 | 6/2001 |
| JP | 2001-294166 | 10/2001 |
| WO | WO 01/55597 | 8/2001 |
| WO | WO 01/79703 | 10/2001 |
| WO | WO 03/058071 | 7/2003 |

* cited by examiner

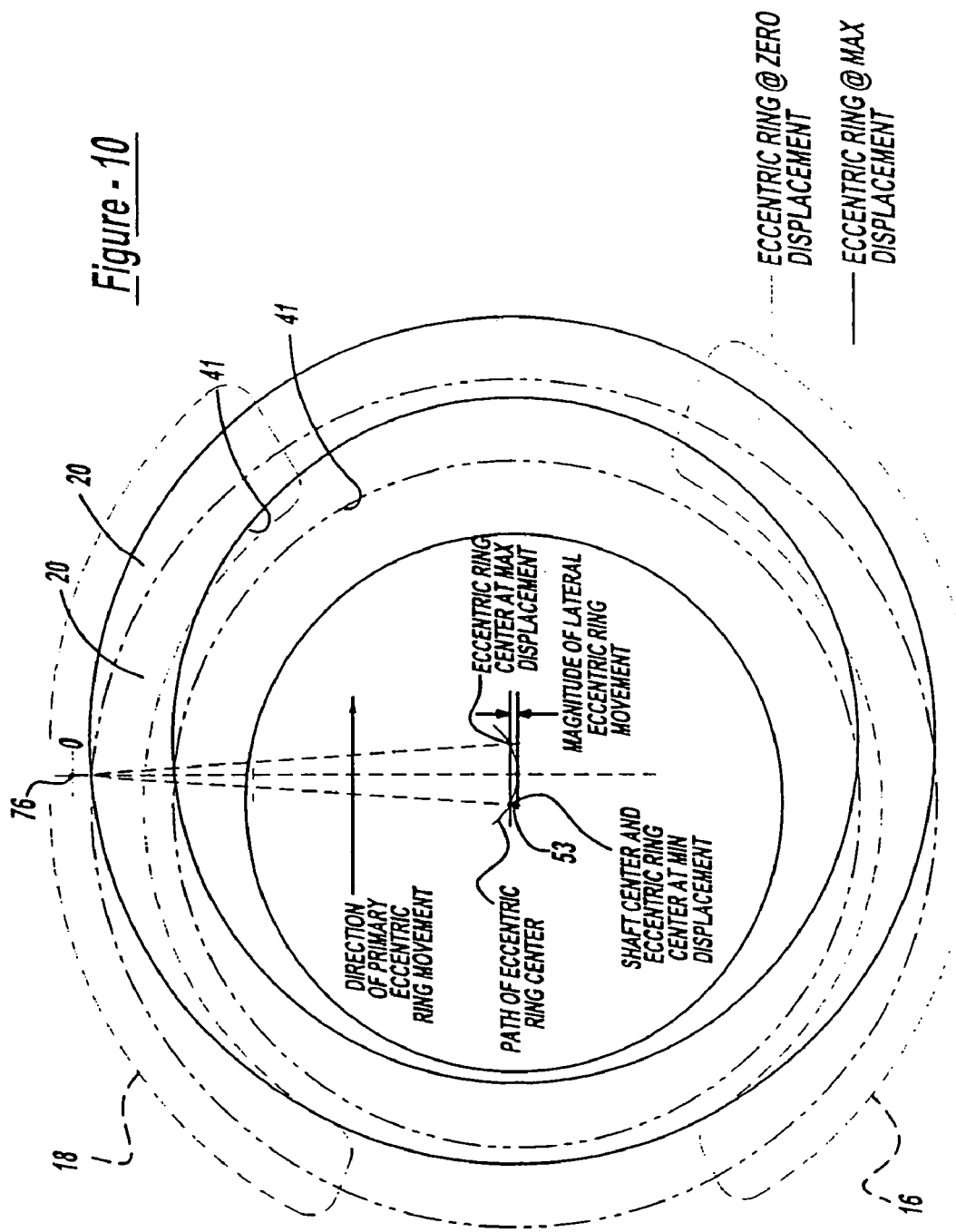

VARIABLE DISPLACEMENT VANE PUMP WITH VARIABLE TARGET REGULATOR

CROSS-REFERENCE TO RELATED APPLICATION

This application claims the benefit of U.S. Provisional Patent Application Ser. No. 60/510,222, filed Oct. 10, 2003, titled "Variable Displacement Vane Pump With Variable Target Regulator," and is a continuation-in-part of U.S. application Ser. No. 10/192,578, filed Jul. 10, 2002, titled "Variable Displacement Vane Pump with Variable Target Regulator," which claims the benefit of U.S. Provisional Patent Application Ser. No. 60/304,604, filed Jul. 11, 2001, titled "Variable Displacement Hydraulic Pump System With a Variable Target Regulation Valve Subsystem," and is a continuation-in-part of U.S. patent application Ser. No. 10/021,566, filed Dec. 12, 2001, titled "Variable Displacement Vane Pump with Variable Target Regulator," which claims the benefit of U.S. Provisional Patent Application Ser. No. 60/255,629, filed Dec. 12, 2000, titled "Variable Displacement Pump and Method," the entire specifications of all of which are expressly incorporated herein by reference.

FIELD OF THE INVENTION

This invention relates generally to fluid pumps and more particularly to a variable displacement vane pump and control and operation of the pump under varying engine speed conditions.

BACKGROUND OF THE INVENTION

Hydraulic power transmission assemblies and fluid distribution systems may utilize a vane-type pump. Such pumps typically have a rotor with a plurality of circumferentially spaced vanes rotatably carried by the rotor and slidable relative thereto in slots provided in the rotor. The rotor and vanes cooperate with the internal contour of a containment ring or eccentric ring eccentrically mounted relative to an axis of the rotor and vanes to create fluid chambers between the containment ring or eccentric ring, rotor and vanes. Due to the eccentricity between the containment ring or eccentric ring and the rotor and vanes, the fluid chambers change in volume as they are moved with the rotating rotor and become larger in volume as they are moved across an inlet port and smaller in volume across an outlet port. To vary the eccentricity between the containment ring or eccentric ring and the rotor, the containment ring or eccentric ring may be pivoted upon a fixed axis in a pump housing. Pivoting the containment ring or eccentric ring varies the change in volume of the fluid chambers in use of the pump and hence, varies the displacement characteristic of the pump. A description of inherent problems with prior art pumps is set forth in the Background of Invention section of the above-referenced co-pending opposition U.S. Ser. No. 10/021,566. A description of an improved pump and method of control is set forth below.

While such a pump improves proper oil pressure and flow control, improvements in oil control are desired.

A typical internal combustion engine requires a certain flow rate of lubricating oil delivered within a certain range of pressure, the flow rate and pressure varying with the speed of crankshaft rotation, the engine temperature and the engine load. A fixed displacement pump operating at high speeds and at cold start conditions can produce excessively high oil pressures, and at high temperature and low speed conditions the oil pressure can be less than desired. Increasing the displacement of the oil pump to improve the oil pressure at high temperature and low speed conditions will consume more power at all conditions and will worsen the excessive oil pressure at high speed and low temperature conditions. It is desirable to provide improved control over conventional fixed displacement pumps that will operate at higher efficiency and optimizes pump output flow and pressure in accordance with engine speed and engine operating conditions.

Also, current energy conservation requirements for automotive equipment, coupled with increased pump displacements for actuation of variable cam/valve timing systems, demand more efficient engine lubrication system designs.

SUMMARY OF THE INVENTION

A lubricant pumping system for providing lubrication to an engine or an apparatus having a variable speed-rotating shaft. The lubricant system includes a first lubricant pump having variable displacement that is variably adjustable in response to a control input. A second fixed displacement pump is operably connected to a rotating shaft of the engine to provide a control input for adjusting pumping characteristics of the variable displacement pump to achieve a target pressure in the engine oil circuit. A solenoid valve is connected to the output of the second fixed displacement pump. The solenoid valve bleeds the pump output and thus controls input when actuated to provide a second variable target curve when desired.

BRIEF DESCRIPTION OF THE DRAWINGS

These and other objects, features and advantages of this invention will be apparent from the following detailed description of the preferred embodiments, appending claims and accompanying drawings in which:

FIG. 10 is a diagrammatic view of the containment ring or eccentric ring of the vane pump in its zero-displacement and maximum-displacement positions;

DETAILED DESCRIPTION OF THE PREFERRED EMBODIMENTS

Figure 1:
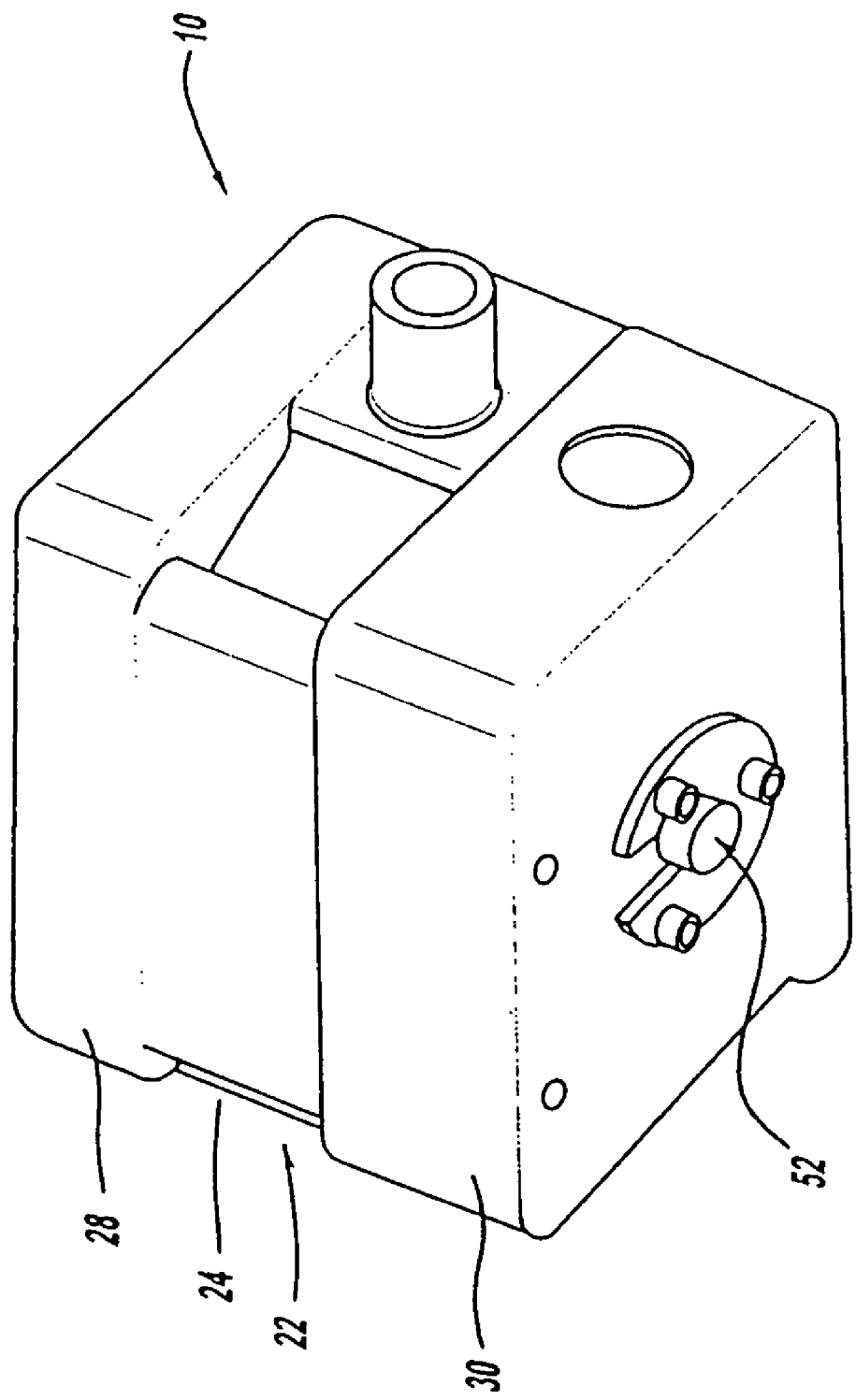
FIG. 1 is a perspective view of a variable displacement eccentric vane pump according to the present invention.
Figure 2:
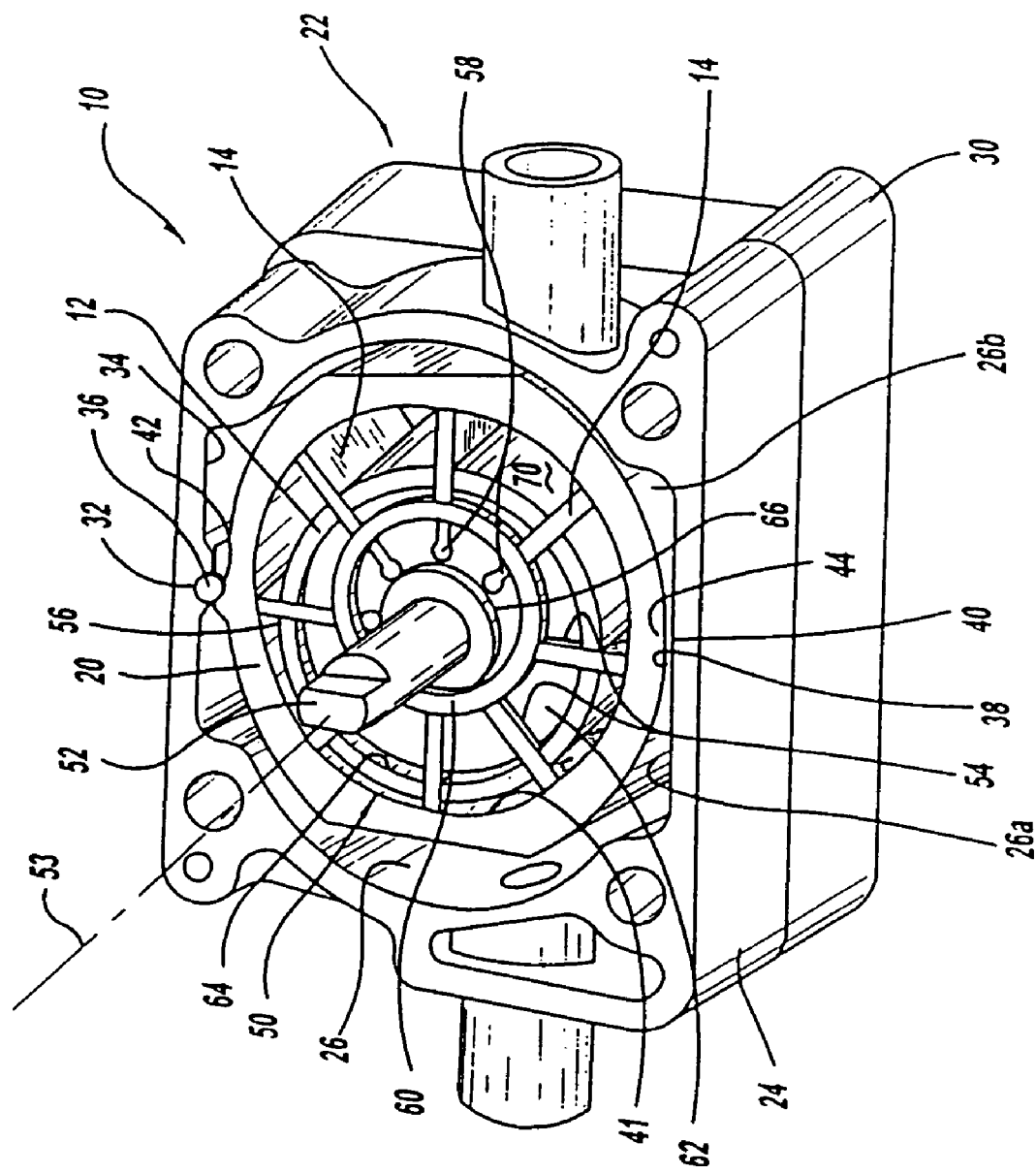
FIG. 2 is a perspective view of the vane pump of FIG. 1 with a side plate removed to show the internal components of the pump.
Figure 3:
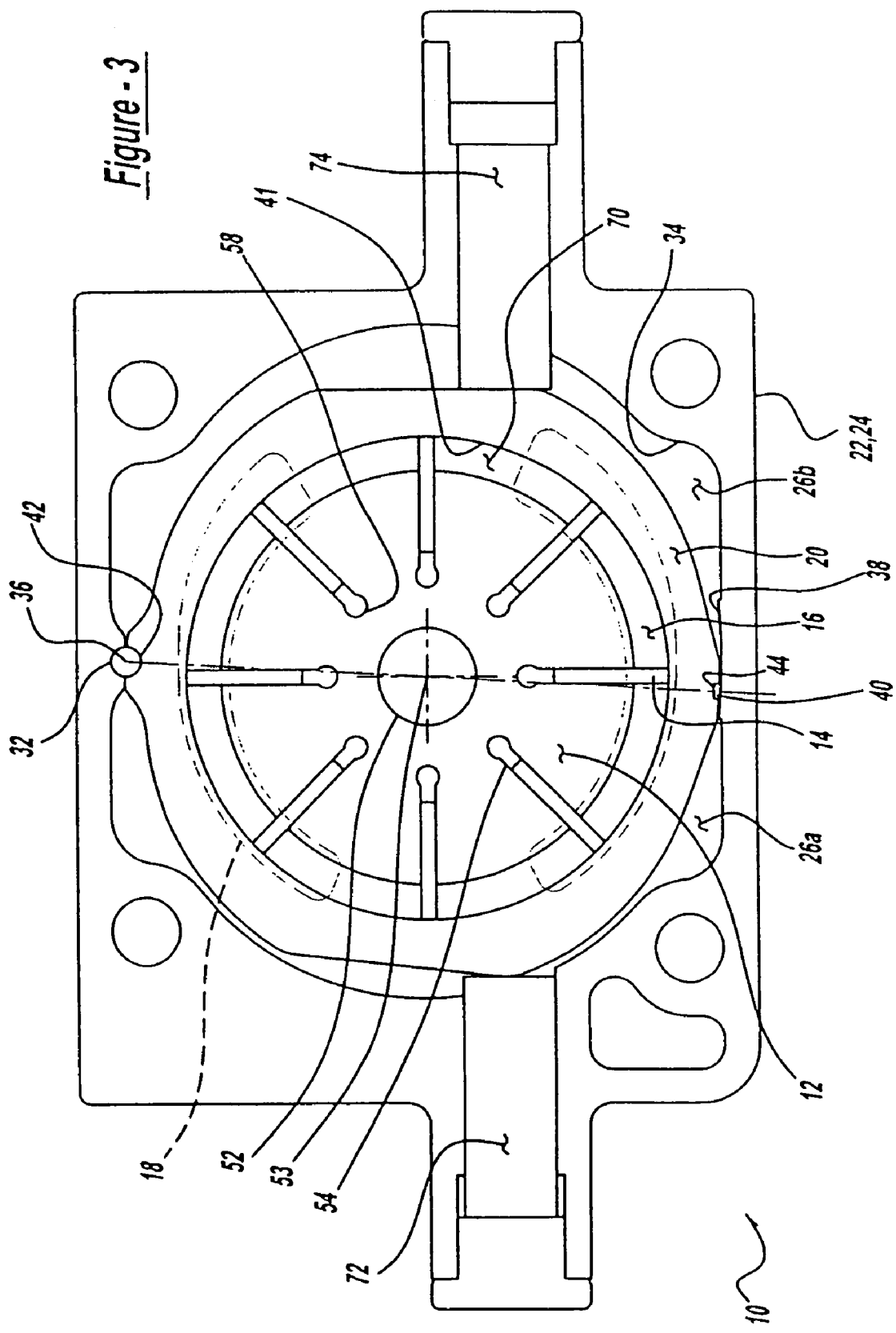
FIG. 3 is a plan view of the pump as in FIG. 2 illustrating the containment ring or eccentric ring in its zero-displacement position.

Referring in more detail to the drawings, FIGS. 1-3 illustrate a variable displacement vane pump 10 having a rotor 12 and associated vanes 14 driven for rotation to draw fluid through a pump inlet 16, increase the pressure of the fluid, and discharge the fluid under pressure from an outlet 18 of the pump 10. A containment ring or eccentric ring 20 is carried by a housing 22 of the pump 10 and is pivoted relative to the rotor 12 to vary the displacement of the pump. Such a pump 10 is widely used in a plurality of fluid applications including engine lubrication and power transmission applications.

The housing 22 preferably comprises a central body 24 defining an internal chamber 26 in which the containment ring or eccentric ring 20 and rotor 12 are received. The housing 22 further includes a pair of end plates 28, 30 on opposed, flat sides of the central body 24 to enclose the chamber 26. A groove 32 formed in an internal surface 34 of the central body 24 is constructed to receive a pivot pin 36 between the containment ring or eccentric ring 20 and housing 22 to permit and control pivotal movement of the containment ring or eccentric ring 20 relative to the housing 22. Spaced from the groove 32 and preferably at a generally diametrically opposed location, a seat surface 38 is provided in the central body 24. The seat surface 38 is engageable with the containment ring or eccentric ring 20 in at least certain positions of the containment ring or eccentric ring to provide a fluid tight seal between them. One or both of the containment ring or eccentric ring 20 and central body 24 may carry an elastomeric or other type seal 40 that defines at least in part the seat surface and reduces leakage between the containment ring or eccentric ring 20 and housing 22.

The containment ring or eccentric ring 20 is annular having an opening 41 and is received within the chamber 26 of the housing 22. The containment ring or eccentric ring 20 has a groove 42 in its exterior surface which receives in part the pivot pin 36 to permit pivotal movement between the containment ring or eccentric ring 20 and central body 24. In an alternate embodiment, the eccentric ring could be configured such that a portion of the eccentric ring surrounds the pivot pin to provide a more robust positioning of the pivot point. Such pivotal movement of the containment ring or eccentric ring 20 is limited by engagement of the exterior surface of the containment ring or eccentric ring 20 with the interior surface 34 of the central body 24 (or by control pistons 72 and 74, which is set forth below). As viewed in FIGS. 4 and 10, the containment ring or eccentric ring 20 is pivoted counterclockwise into engagement with the housing 22 in its first position wherein the pump 10 has its maximum displacement. As best shown in FIGS. 3 and 10, the containment ring or eccentric ring 20 may be pivoted clockwise from its first position to a second position in which the pump 10 has its minimum displacement. Of course, the containment ring or eccentric ring 20 may be operated in any orientation between and including its first and second positions to vary the displacement of the pump, as desired. The containment ring or eccentric ring 20 has an internal surface which is generally circular, but may be contoured or off-centered to improve or alter the pump 10 performance. The containment ring or eccentric ring 20 may also have a second groove 44 in its exterior surface adapted to carry the seal 40 engageable with the internal surface 34 of the central body 24 to provide a fluid tight seal between the containment ring or eccentric ring 20 and central body 24. The fluid tight seal essentially separates the chamber 26 into two portions 26a, 26b on either side of the seal to enable a pressure differential to be generated between the separated chamber portions 26a, 26b. The pressure differential may be used to pivot the containment ring or eccentric ring 20 between or to its first and second positions to control the pump displacement.

To move fluid through the pump 10, a rotating displacement group 50 is provided in the housing 22. The rotating displacement group 50 comprises a central drive shaft 52, the rotor 12 which is carried and driven for rotation by the drive shaft 52, and a plurality of vanes 14 slidably carried by the rotor 12 for co-rotation with the rotor 12. The drive shaft 52 is fixed in position for rotation about its own axis 53. The rotor 12 is fixed to the drive shaft 52 for co-rotation therewith about the axis 53 of the shaft 52.

As shown, the rotor 12 is a generally cylindrical member having a plurality of circumferentially spaced apart and axially and radially extending slots 54 that are open to an exterior surface 56 of the rotor 12 and which terminate inwardly of the exterior surface 56. Each slot 54 is constructed to slidably receive a separate vane 14 so that the vanes are movable relative to the rotor 12 between retracted and extended positions. Each slot 54 in the rotor 12 preferably terminates at a small chamber 58 constructed to receive pressurized fluid. The pressurized fluid in a chamber 58 acts on the vane 14 in the associated slot 54 to cause the vane 14 to slide radially outwardly until it engages the internal surface 34 of the containment ring or eccentric ring 20. Preferably, during operation of the pump 10, the fluid pressure within the chamber 58 and slot 54 is sufficient to maintain substantially continuous contact between the vanes 14 and the internal surface 41 of the containment ring or eccentric ring 20.

In accordance with one aspect of the present invention, a vane extension member 60 is movably positioned on the rotor 12 to engage one or more of the vanes 14 and cause such vanes 14 to extend radially outwardly beyond the periphery of the rotor 12. This facilitates priming the pump 10 by ensuring that at least two of the vanes 14 extend beyond the periphery of the rotor 12 at all times. Without the extension member 60 the vanes 14 may tend to remain in their retracted position, not extending beyond the exterior 56 of the rotor 12, such that subsequent turning of the rotor 12 without any vanes 14 extending outwardly therefrom, does not displace sufficient fluid to prime the pump 10 and increase the pump output pressure. Accordingly, no fluid pressure is generated in the chambers 58 or slots 54 of the rotor 12 and therefore no pressure acts on the vanes 14 causing them to extend outwardly and the pump 10 will not prime. Such a condition may be encountered, for example, in mobile and automotive applications when starting a cold vehicle in cold weather such as during a cold start of an automobile.

In the embodiment shown in FIG. 2, the vane extension member 60 is a ring slidably received in an annular recess 62 formed in an end face of the rotor 12 and having a diameter sufficient to ensure that at least two of the vanes 14 extend beyond the periphery of the rotor 12 at all times. The recess 62 provides an outer shoulder 64 and an inner shoulder 66 between which the ring 60 may slide. The ring 60 slides in the recess 62 when acted on by vanes 14 which are radially inwardly displaced via engagement with the containment ring or eccentric ring 20 thereby pushing the ring 60 towards the diametrically opposed vanes 14 causing them to extend beyond the periphery of the rotor 12. The ring 60 is retained between the rotor 12 and the adjacent side plate of the housing 22 in assembly of the pump 10. A second ring may be provided on the opposite face of the rotor, if desired.

Figure 6:
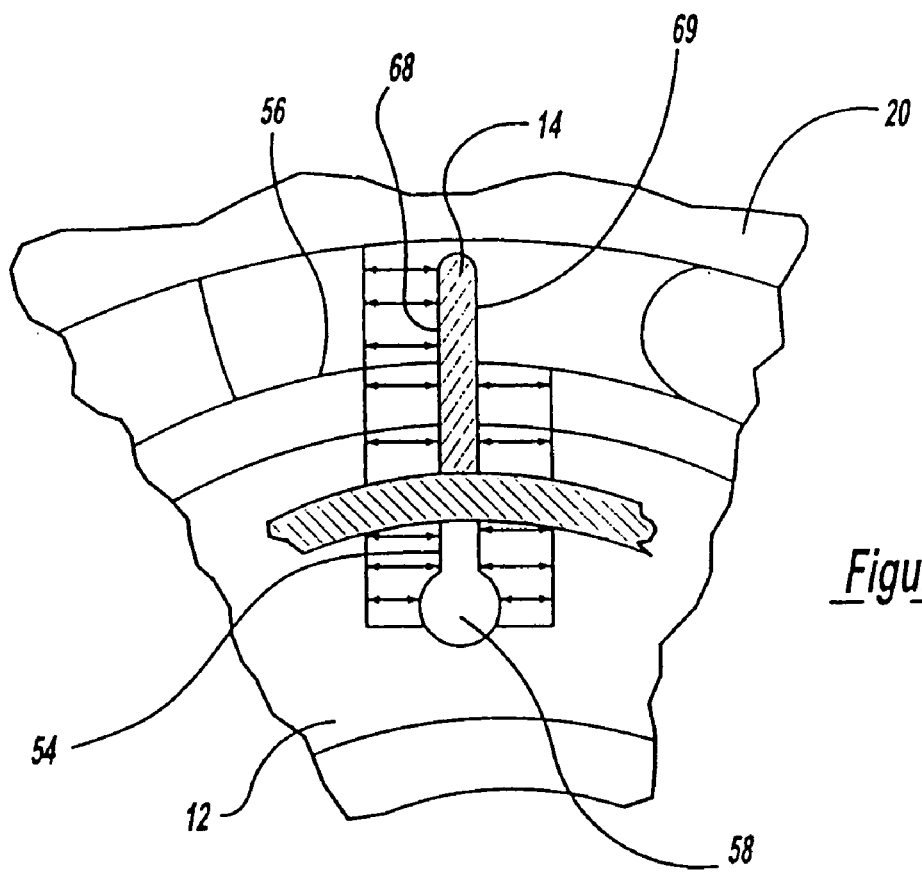
FIG. 6 is an enlarged, fragmentary sectional view illustrating a portion of the rotor and a vane according to the present invention.
Figure 7:
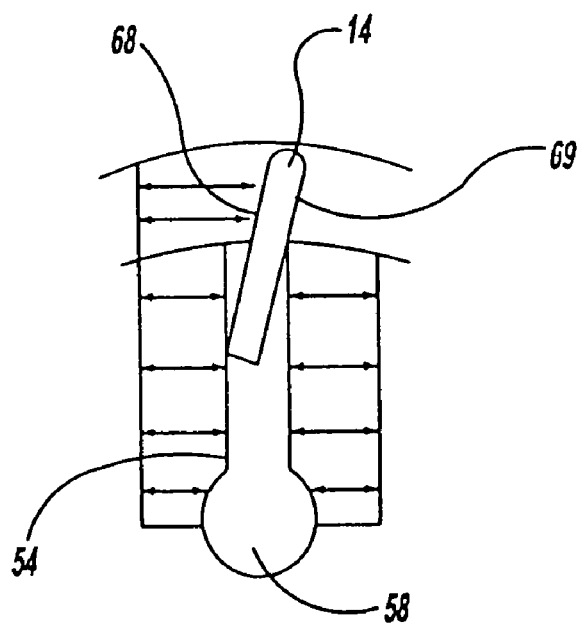
FIG. 7 is an enlarged, fragmentary sectional view of the rotor and vane illustrating a seal between the vane and rotor when the vane is tilted within its slot in the rotor.

Desirably, as shown in FIGS. 6 and 7, the slots 54 in the rotor 12 are sized to permit a fluid film to form on the leading and trailing faces 68, 69 of each vane 14. The fluid film supports the vanes 14 as the rotor 12 rotates. The fluid film prevents wear of the vane slot, effectively creating a bearing surface. Additionally, the size of the slots 54 is desired to prevent vane tilt while still allowing fluid to enter a contact seal between the rotor 12 and vanes 14 in the areas of their contact should vane tilting occur, to the extent that any vane tilting is present. The contact seals maintain the pressurized fluid acting on the vanes 14 and prevents it from leaking or flowing out of the slots 54. Such leakage is otherwise likely to occur due to the pressure differential between the fluid in the chambers 58 and slots 54 which is at pump outlet pressure and lower pressure portions of the pump cycle (nearly all but at the outlet of the pump). By preventing this leakage, it is ensured that a sufficient hydrostatic force biases the vanes 14 radially outwardly toward the containment ring or eccentric ring 20 to improve the continuity of the contact between the vanes 14 and the containment ring or eccentric ring 20.

To displace fluid, the containment ring or eccentric ring 20 is mounted eccentrically relative to the drive shaft 52 and rotor 12. This eccentricity creates a varying clearance or gap between the containment ring or eccentric ring 20 and the rotor 12. The varying clearing creates fluid pumping chambers 70, between adjacent vanes 14, the rotor 12 and the internal surface of the containment ring or eccentric ring 20, which have a variable volume as they are rotated in use. Specifically, each pumping chamber 70 increases in volume during a portion of its rotational movement, thereby creating a drop in pressure in that pumping chamber 70 tending to draw fluid therein. After reaching a maximum volume, each pumping chamber 70 then begins to decrease in volume increasing the pressure therein until the pumping chamber is registered with an outlet and fluid is forced through said outlet at the discharge pressure of the pump 10. Thus, the eccentricity provides enlarging and decreasing pumping chambers 70 which provide both a decreased pressure to draw fluid in through the inlet of the pump 10 and thereafter increase the pressure of the fluid and discharge it from the outlet of the pump 10 under pressure.

The degree of the eccentricity determines the operational characteristics of the pump 10, with more eccentricity providing higher flow rate of the fluid through the pump 10 and less eccentricity providing a lower flow rate in pressure of the fluid. In a so-called "zero displacement position" or the second position of the containment ring or eccentric ring 20 shown in FIG. 3, the opening 41 is essentially coaxially aligned with the rotor 12 so that the fluid pumping chambers 70 have an essentially constant volume throughout their rotation. In this orientation, the pumping chambers 70 do not enlarge to draw flow therein nor do they become smaller in volume to increase the pressure of fluid therein creating a minimum performance condition or a zero displacement condition of the pump 10. Preferably, it is desirable to have a minimum displacement of the pump that maintains proper operational characteristics of the pump. When the containment ring or eccentric ring 20 is in its first or maximum displacement position or any displacement between maximum and minimum displacement, the pumping chambers 70 vary in size between their maximum volume and minimum volume as the rotor 12 rotates providing increased pump displacement.

Figure 4:
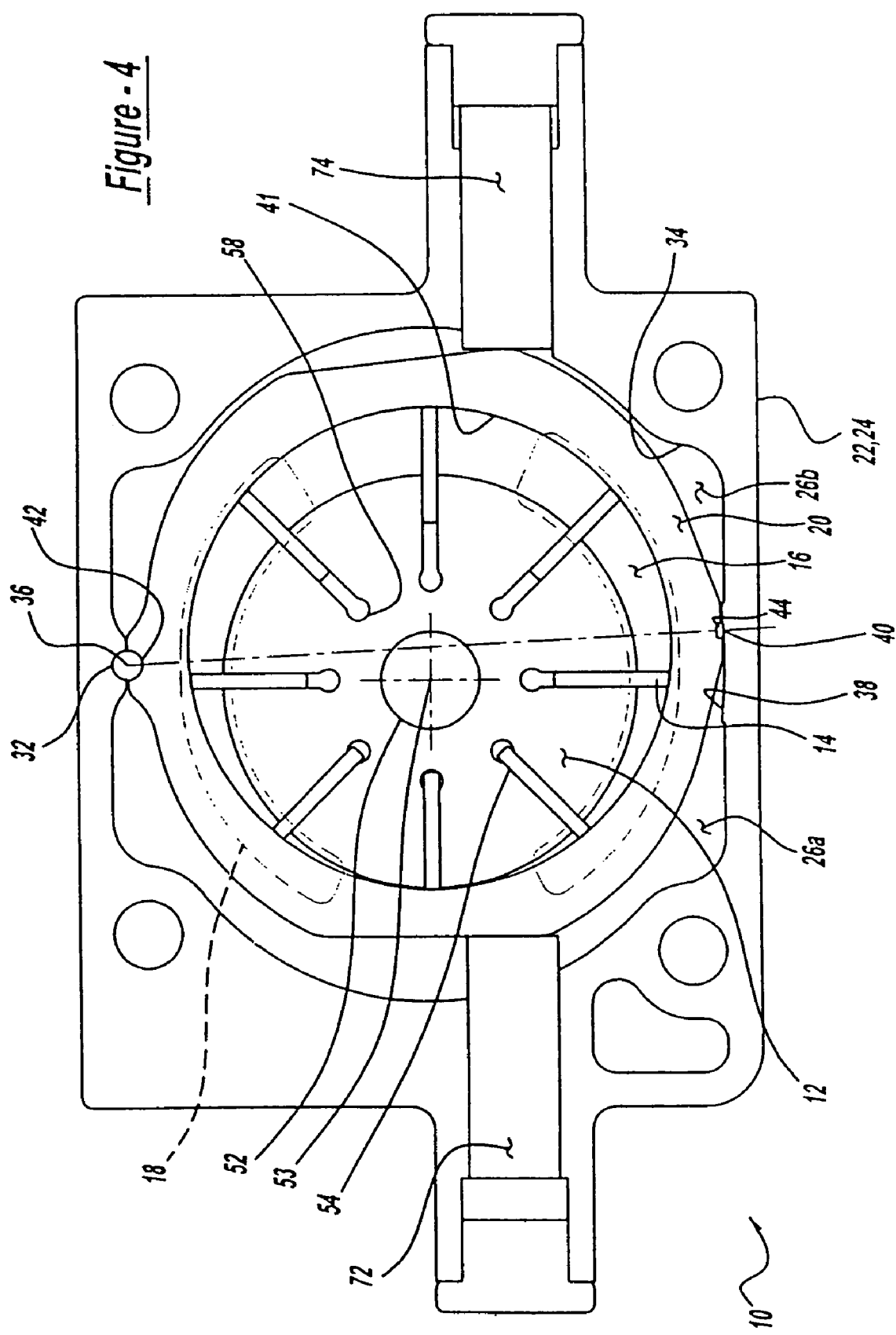
FIG. 4 is a plan view of the pump as in FIG. 2 illustrating the containment ring or eccentric ring in its maximum-displacement position.

As shown in FIGS. 3 and 4, to control the pivoting and location of the containment ring or eccentric ring 20 a pair of pistons 72, 74 may be utilized with the pistons 72, 74 operable in opposed directions to pivot the containment ring or eccentric ring 20 between its first and second positions. Desirably, each piston 72, 74 may be responsive to different fluid pressure signals that may be taken from two different points in the fluid circuit, one of which must come from the regulating valve. Accordingly, two different portions of the fluid circuit may be used to control the displacement of the containment ring or eccentric ring 20, and hence the operation and displacement of the pump 10. The pistons 72, 74 may be of different sizes as desired to vary the force on the pistons from the pressurized fluid signals. Further, one or both of the pistons 72, 74 may be biased by a spring, or other mechanism to aid in controlling the movement of the containment ring or eccentric ring 20 and operation of the pump. As an alternative, if a seal 40 is provided between the containment ring or eccentric ring 20 and housing 22, a controlled volume of fluid under pressure may be disposed directly in the chamber portions 26a, 26b defined on opposite sides of the seal 40. Fluid at different volumes and pressures may be provided on either side of the seal 40 to control the movement of the containment ring or eccentric ring 20. Of course, any combination of these actuators may be used to control the movement and position of the containment ring or eccentric ring 20 in use of the pump 10.

Desirably, as best shown in FIG. 10, in accordance with a further aspect of the present invention, the axis 76 about which the containment ring or eccentric ring 20 is pivoted is located to provide an essentially linear movement of the containment ring or eccentric ring 20 between its first and second positions. To do so, the containment ring or eccentric ring 20 is pivoted about an axis 76 which is offset from the drive shaft axis 53 by one-half of the distance of travel in the direction of eccentricity of the containment ring or eccentric ring 20 between its first and second positions. In other words, the pivot axis 76 of the containment ring or eccentric ring 20 is offset from the drive shaft axis 53 by one-half of the maximum eccentricity of the containment ring or eccentric ring 20 relative to the drive shaft axis 53, and hence, relative to the rotor 12. The pivoting movement of the containment ring or eccentric ring 20 occurs along an at least somewhat arcuate path. By positioning the pivot axis 76 of the containment ring or eccentric ring 20 as described, the path of movement of the containment ring or eccentric ring 20 becomes essentially linear between its first and second positions. Non-linear or compound movement of the containment ring or eccentric ring 20 affects the gap or clearance between the rotor 12 and the containment ring or eccentric ring 20. The performance and operating characteristics of the pump 10 are influenced by this gap or clearance.

Accordingly, the non-linear movement of the containment ring or eccentric ring 20 when it is pivoted can vary the size of the fluid chambers throughout the pump 10, and importantly, in the area of the inlet 16 and outlet 18 of the pump. For example, the pumping chambers 70 may become slightly larger in volume as they approach the outlet 18 reducing the pressure of fluid therein and causing inefficient pressurization of the fluid at the discharge port. Desirably, offsetting the pivot axis 76 of the containment ring or eccentric ring 20 in accordance with this invention provides a movement of the containment ring or eccentric ring 20 which reduces such centrality errors and facilitates control of the pump operating characteristics to improve pump performance and efficiency. The arrangement of the invention also permits a more simple pump design with a center point of the containment ring or eccentric ring opening 41 moving along an essentially linear path. Further, the pump 10 should operate with less airborne or fluid-borne noise.

Figure 5:
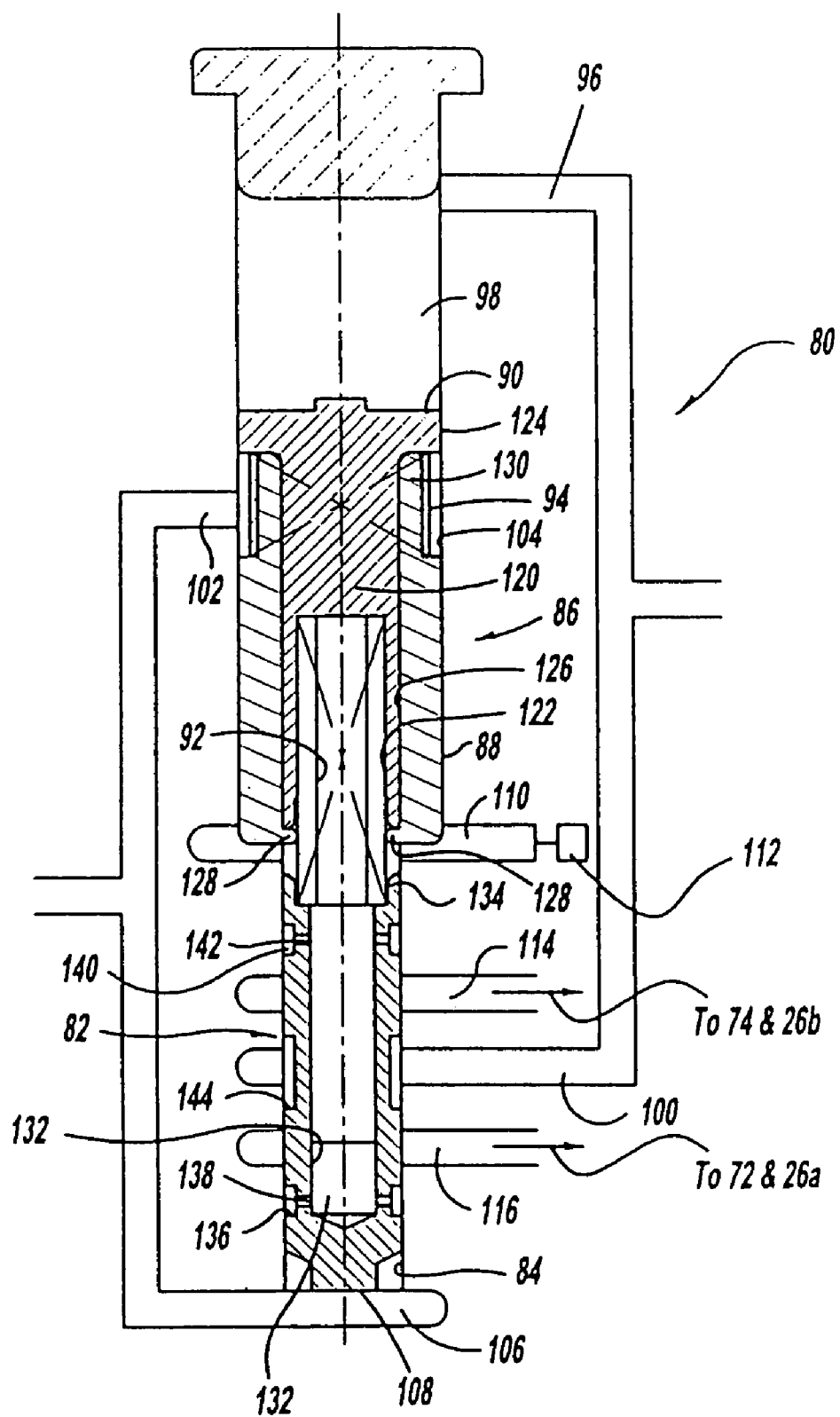
FIG. 5 is a diagrammatic sectional view of a variable target dual pilot regulation valve which pivots the containment ring or eccentric ring of the pump according to one aspect of the present invention.

Preferably, to control the application of fluid pressure signals to the actuators that in turn control the movement of the containment ring or eccentric ring 20, a single control valve 80 reacts to two pilot pressure signals and their application to the actuators. As shown in FIG. 5, the control valve 80 has a spool portion 82 with a plurality of annular grooves and lands between adjacent grooves providing sealing engagement with a bore 84 in which the spool portion 82 is received. The valve 80 also has a piston portion 86 comprising an outer sleeve 88 and an inner piston 90 slidably carried by the sleeve 88. A first spring 92 is disposed between the plunger 90 and the spool portion 82 to yieldably bias the position of the spool portion 82 and a second spring 94 is disposed between the sleeve 88 and the plunger 90 to yieldably bias the plunger 90 away from the sleeve 88.

Figure 8:
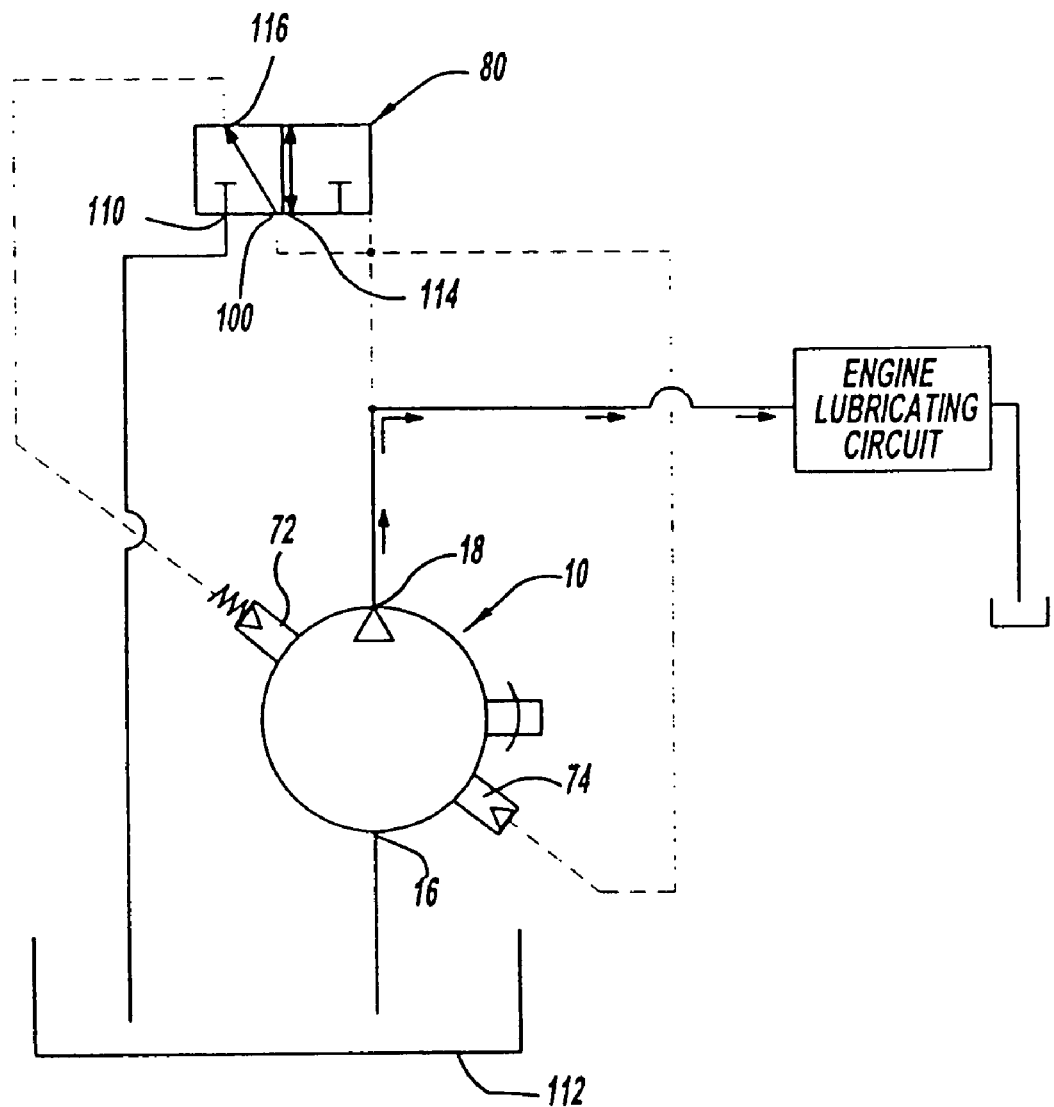
FIG. 8 is a schematic representation of the hydraulic circuit of the vane pump of an embodiment of this invention including a 3-way regulation valve.

As shown in FIGS. 5 and 8, the valve 80 has a first inlet 96 through which fluid discharged from the pump 10 is communicated with a chamber 98 in which the plunger 90 is received to provide a force acting on the plunger 90 in a direction opposing the biasing force of the second spring 94. A second inlet 100 communicates fluid discharged from the pump 10 with the spool portion 82. A third inlet 102 communicates fluid pressure from a downstream fluid circuit source from a second portion of the fluid circuit with a chamber 104 defined between the plunger 90 and outer sleeve 88. A fourth inlet 106 communicates the second portion of the fluid circuit with an end 108 of the spool portion 82 located opposite the plunger 90. In addition to the inlets, the valve 80 has a first outlet 110 communicating with a sump or reservoir 112, a second outlet 114 communicating with the first actuator 74 (or chamber 26b), and a third outlet 116 communicating with the second actuator 72 (or chamber 26a). As discussed above, the first and second actuators 72, 74 control movement of the containment ring or eccentric ring 20 to vary the displacement of the pump 10.

In more detail, the plunger 90 has a cylindrical body 120 with a blind bore 122 therein to receive and retain one end of the first spring 92. An enlarged head 124 at one end of the plunger 90 is closely slidably received in the chamber 98, which may be formed in, for example, the pump housing 22, and is constructed to engage the outer sleeve 88 to limit movement of the plunger 90 in that direction. The outer sleeve 88 is preferably press-fit or otherwise fixed against movement in the chamber 98. The outer sleeve 88 has a bore 126 which slidably receives the body 120 of the plunger 90, a radially inwardly extending rim 128 at one end to limit movement of the spool portion 82 toward the plunger 90, and a reduced diameter opposite end 130 defining the annular chamber 104 in which the second spring 94 is received. The annular chamber 104 may also receive fluid under pressure from inlet 102 that acts on the plunger 90.

The spool portion 82 is generally cylindrical and is received in the bore 84 of a body, such as the pump housing 22. The spool portion 82 has a blind bore 132, is open at one end 134 and is closed at its other end 108. A first recess 136 in the exterior of the spool portion 82 leads to one or more passages 138 which open into the blind bore 132. The first recess 136 is selectively aligned with the third outlet 116 to permit the controlled volume of pressurized fluid, keeping the displacement high at the second actuator 72 (chamber 26a) to vent back through the spool portion 82 via the first recess 136, corresponding passages 138, blind bore 132 and the first outlet 110 leading to the sump or reservoir 112. This reduces the volume and pressure of fluid at the second actuator 72 (chamber 26a). Likewise, the spool portion 82 has a second recess 140 which leads to corresponding passages 142 opening into the blind bore 132 and which is selectively alignable with the second outlet 114 to permit fluid controlled volume of pressurized fluid, keeping the displacement low at the first actuator 74 (chamber 26b) to vent back through the valve 80 via the second recess 140, corresponding passages 142, blind bore 132 and first outlet 110 to the sump or reservoir 112.

The spool portion 82 also has a third recess 144 disposed between the first and second recesses 136, 140 and generally aligned with the second inlet 100. The third recess 144 has an axial length greater than the distance between the second inlet 100 and the second outlet 114 and greater than the distance between the second inlet 100 and the third outlet 116. Accordingly, when the spool portion 82 is sufficiently displaced toward the plunger portion 86, the third recess 144 communicates the second outlet 114 with the second inlet 100 to enable fluid at discharge pressure to flow through the second outlet 114 from the second inlet 100. This increases the volume and pressure of fluid acting on the first actuator 74. Likewise, when the spool portion 82 is displaced sufficiently away from the plunger portion 86, the third recess 144 communicates the second inlet 100 with the third outlet 116 to permit fluid at pump discharge pressure to flow through the third outlet 116 from the second inlet 100. This increases the volume and pressure of fluid acting on the second actuator 72. From the above it can be seen that displacement of the spool portion 82 controls venting of the displacement control chamber through the first and second recesses 136, 140, respectively, when they are aligned with the second and third outlets 114, 116, respectively. Displacement of the spool portion 82 also permits charging or increasing of the pilot pressure signals through the third recess 144 when it is aligned with the second and third outlets 114, 116, respectively.

Desirably, the displacement of the spool portion 82 may be controlled at least in part by two separate fluid signals from two separate portions of the fluid circuit. As shown, fluid at pump discharge pressure is provided to chamber 98 so that it is applied to the head 124 of the plunger 90 and tends to displace the plunger 90 toward the spool portion 82. This provides a force (transmitted through the first spring 92) tending to displace the spool portion 82. This force is countered, at least in part, by the second spring 94 and the fluid pressure signal from a second point in the fluid circuit which is applied to the distal end 108 of the spool portion 82 and to the chamber 104 between the outer sleeve 88 and plunger 90 which acts on the head 124 of the plunger 90 in a direction tending to separate the plunger from the outer sleeve. The movement of the spool portion 82 can be controlled as desired by choosing appropriate springs 92, 94, fluid pressure signals and/or relative surface areas of the plunger head 124 and spool portion end 108 upon which the pressure signals act. Desirably, to facilitate calibration of the valve 80, the second spring 94 may be selected to control the initial or at rest compression of the first spring 92 to control the force it applies to the spool portion 82 and plunger 90.

In response to these various forces provided by the springs 92, 94 and the fluid pressure signals acting on the plunger 90 and the spool portion 82, the spool portion 82 is moved to register desired recesses with desired inlet or outlet ports to control the flow of fluid to and from the first and second actuators 72, 74 (or chamber 26a/26b). More specifically, as viewed in FIG. 5, when the spool portion 82 is driven downwardly, the third recess 144 bridges the gap between the second inlet 100 and the third outlet 116 so that pressurized fluid discharged from the pump 10 is provided to the second actuator 72. This movement of the spool portion 82 preferably also aligns the second recess 140 with the second outlet 114 to vent the volume and pressure of fluid at the first actuator 74 to the sump or reservoir 112. Accordingly, the containment ring or eccentric ring 20 will be displaced by the second actuator 72 toward its first position increasing the displacement of the pump 10. As the spool portion 82 is driven upwardly, as viewed in FIG. 5, the third recess 144 will bridge the gap between the second inlet 100 and the second outlet 114 providing fluid at pump discharge pressure to the first actuator 74. This movement of the spool portion 82 preferably also aligns the first recess 136 with the third outlet 116 to vent the volume of and pressure of fluid at the second actuator 72 to the sump or reservoir 112. Accordingly, the containment ring or eccentric ring 20 will be moved toward its second position decreasing the displacement of the pump 10. The spool 82 operates with the bore 84 and outlets to behave as what is commonly known as a "4-way directional valve". In this manner, the relative controlled volume and pressures are controlled by two separate pressure signals that may be taken from two different portions of the fluid circuit. In the embodiment shown, a first pressure signal is the fluid discharged from the pump 10 and a second pressure signal is from a downstream fluid circuit source. In this manner, the efficiency and performance of the pump can be improved through more capable control.

Figure 9:
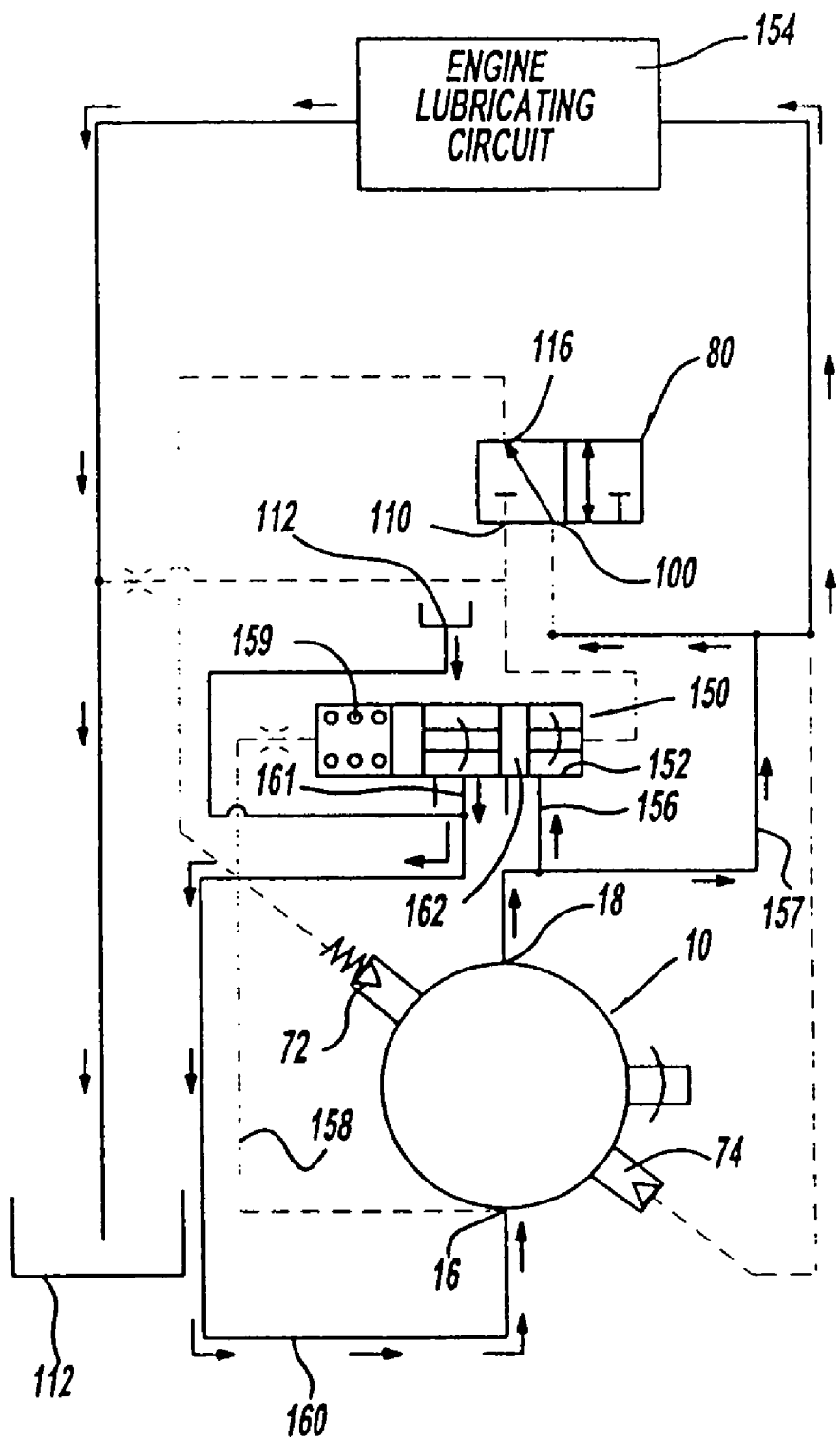
FIG. 9 is a schematic representation of the hydraulic circuit of a vane pump according to the present invention including a 3-way regulation valve and an anti-cavitation valve.

As best shown in FIG. 9, an inlet flow valve 150 in the fluid circuit may be provided to selectively permit fluid at pump discharge pressure to flow back into the pump inlet 16 when the pump 10 is operating at speeds wherein atmospheric pressure is insufficient to fill the inlet port 16 of the pump 10 with fluid. This reduces cavitation and overcomes any restriction of fluid flow to the inlet 16 of the pump 10 or any lack of fluid potential energy. To accomplish this, the inlet flow valve 150 may be a spool type valve slidably received in a bore 152 of a body, such as the pump housing 22, so that it is in communication with the fluid discharged from the pump outlet 18. As shown, the fluid circuit comprises the pump 10, with the pump outlet 18 leading to an engine lubrication circuit 154 through a supply passage 156 which is connected to the bore 152 containing the inlet flow valve 150. Downstream of the engine lubrication circuit 154, fluid is returned to a reservoir 112 with a portion of such fluid routed through a pilot fluid passage 158 leading to the inlet flow valve 150 to provide a pilot pressure signal on the inlet flow valve 150, if desired. A spring 159 may also be provided to bias the inlet flow valve 150. From the reservoir, fluid is supplied through an inlet passage 160 to the inlet 16 of the fuel pump 10. The inlet passage 160 can pass through the bore 152 containing the inlet flow valve 150 and is separated from the supply passage 156 by a land 162 of the inlet flow valve 150 that provides an essentially fluid tight seal with the body.

Accordingly, the fluid discharged from the pump 10 acts on the land 162 by way of passage 156 in communication with from outlet line 157 and tends to displace the inlet flow valve 150 in a direction opposed by the spring 159 and the pilot pressure signal applied to the inlet flow valve 150 through the pilot fluid passage 158. When the pressure of fluid discharged from the pump 10 is high enough, to overcome the spring and pilot pressure from passage 158, the inlet flow valve 150 will be displaced so that its land 162 will be moved far enough to open the inlet passage 160 permitting communication between the supply passage 156 and inlet passage 160 through the bore 152 and passage 161, as shown in FIG. 9. Thus, a portion of the fluid discharged from the pump 10 is fed back into the inlet 16 of the pump 10 along with fluid supplied from the reservoir 112 for the reasons stated above. This aspirated flow of pressurized fluid into the inlet 16 supercharges the pump inlet to ensure that the pump 10 is pumping liquid and not air or gas. This prevents cavitation and improves the pump efficiency and performance.

The purpose of the valve 150 and its supercharging effect is to convert available pressure energy into velocity energy at the inlet to increase the fluid velocity and therefore the suction capacity of the pump.

Figure 8A:
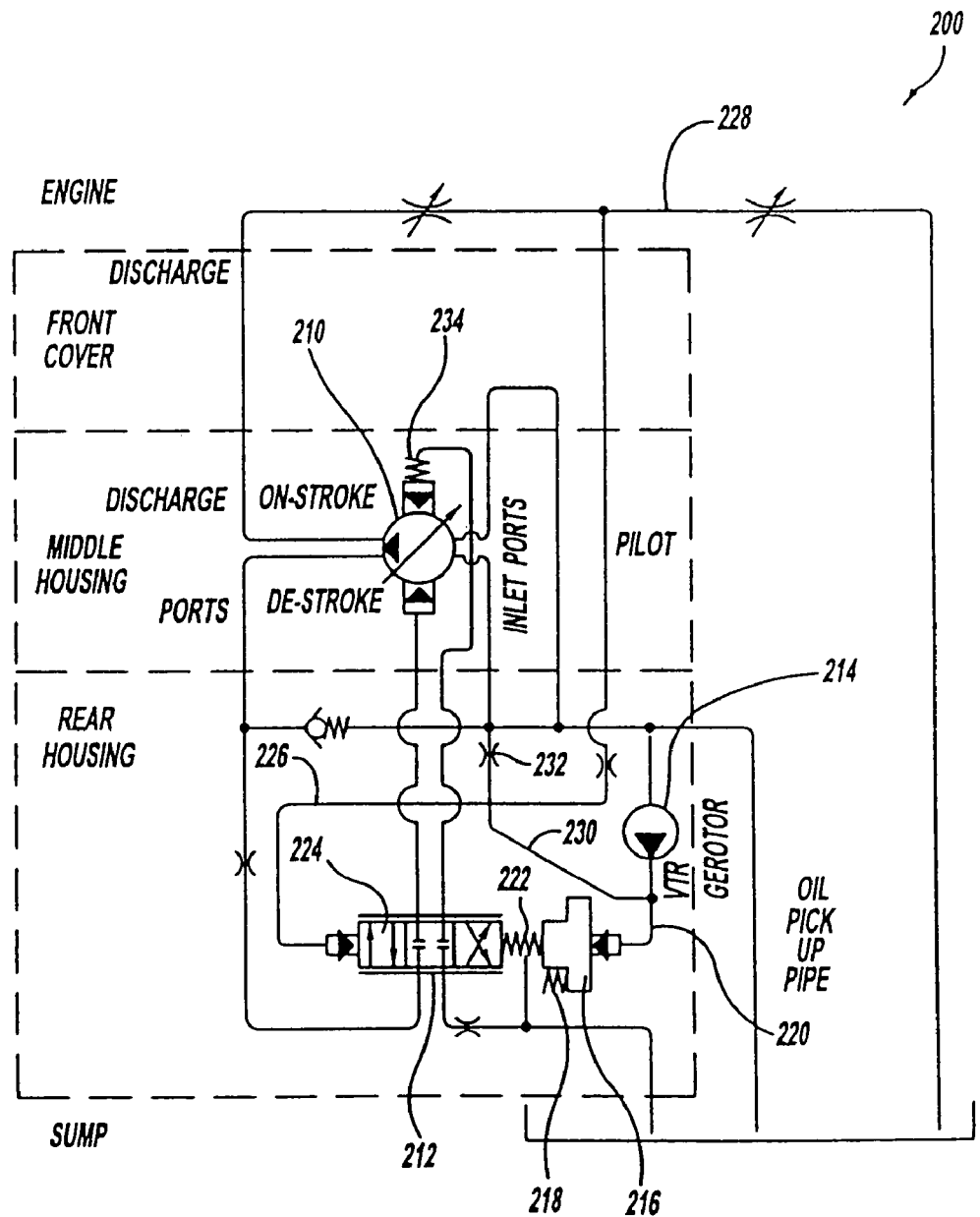
FIG. 8A is a schematic representation of a hydraulic circuit to FIG. 8 which includes an engine speed regulated variable target valve.

With reference now to FIG. 8A, there is shown an alternate embodiment for the control system of a variable displacement pumping system, generally shown at 200. In this embodiment, the control input for controlling the displacement of the variable displacement pump 210 is provided through a control valve 212. A fixed displacement pump 214 is provided which creates a fixed flow in response to crankshaft speed of an engine. The fixed displacement pump is preferably a gerotor pump, however, other fixed displacement pumps that can be actuated by movement of a rotating shaft may be utilized. The fixed displacement pump 214 and variable displacement pump 210 may be driven off of the same shaft or different shafts connected to the engine crankshaft.

The output of the pump 214 is hydraulically coupled with a control piston 216 for biasing the movement of the valve 212, which is similar in operation to valve 82 in FIG. 5. The control piston 216 is mechanically grounded by a spring 218, biasing against movement caused by the input pressure from the pump 214 along hydraulic line 220. A second control spring 222 is operatively connected to the spool portion 224 of valve 212 and piston 216. The movement of the spool valve 224 is actuated by on a first side the hydraulic pressure from the pilot line 226 from the engine oil pressure circuit 228 and on the other side, the spring pressure from spring 222. The output pressure of pump 214 travels along line 220 to add compression to the spring 222 and overcoming spring 218. An output line 230 also sends fluid into the inlet ports to help prevent cavitation at higher engine speeds, but has a calibrated flow resistor 232 for providing a calibrated pressure to the control piston 216, which is tied to engine speed. At the start-up of the engine, the pump 210 is at maximum displacement due to the spring 234. The pressure from the gerotor positions the piston 216, compressing spring 222. This sets the regulation target pressure for valve 212. As the engine pressure builds up in the engine circuit 228 and exceeds the target pressure, the pilot control line 226 biases the spool valve 224 toward movement toward a de-stroke position, which reduces the displacement 210 of the pump, achieving the target pressure. If engine pressure is low, the spool valve will move in the opposite direction. In a low-pressure condition, the spring 222 biases spool valve 212 toward movement toward an on-stroke position, which increases the displacement of pump 210, achieving the target pressure. The flow from pump 214 is directed into the inlet port, adding a supercharging effect to the pump to help prevent cavitation of the pump at high engine speeds.

Figure 8B:
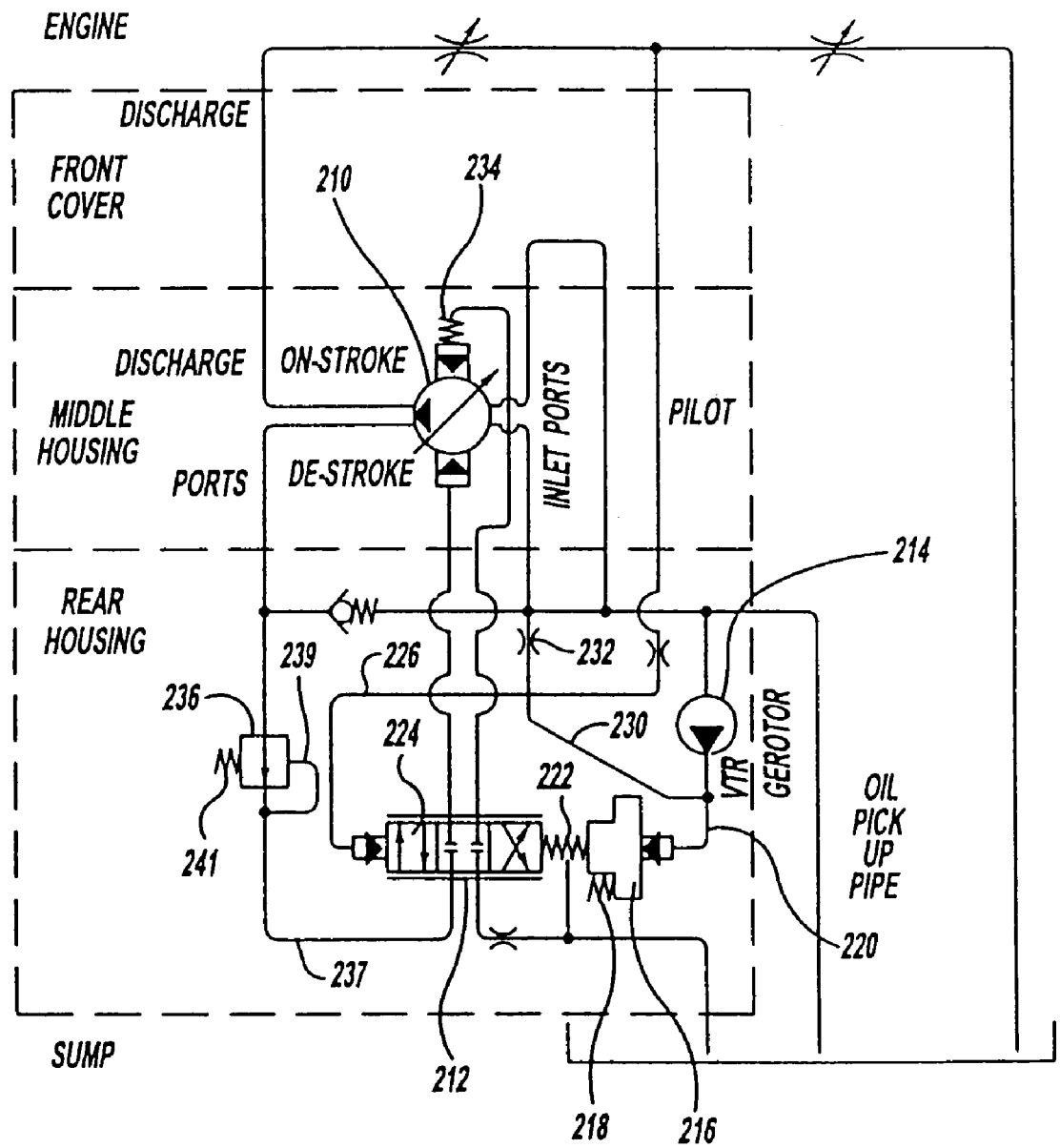
FIG. 8B is a hydraulic schematic similar to FIG. 8A but showing a pressure reducing valve in the pump control system.

In the embodiment shown in FIG. 8B, the hydraulic system is the same as that shown in FIG. 8A, however, a pressure regulating valve 236 is used to stabilize the control of the system. In this embodiment of the invention, valve 236 maintains a predetermined pressure in the control line 237 by way of the pressure feedback from line 239 acting against valve 236 against spring 241. Thus, if pressure is too high in line 237, it restricts the flow on the valve 236, and if pressure is too low in line 237, valve 236 is opened. This provides a stabilized line pressure to actuate the control pistons or control chambers of pump 210.

Figure 9A:
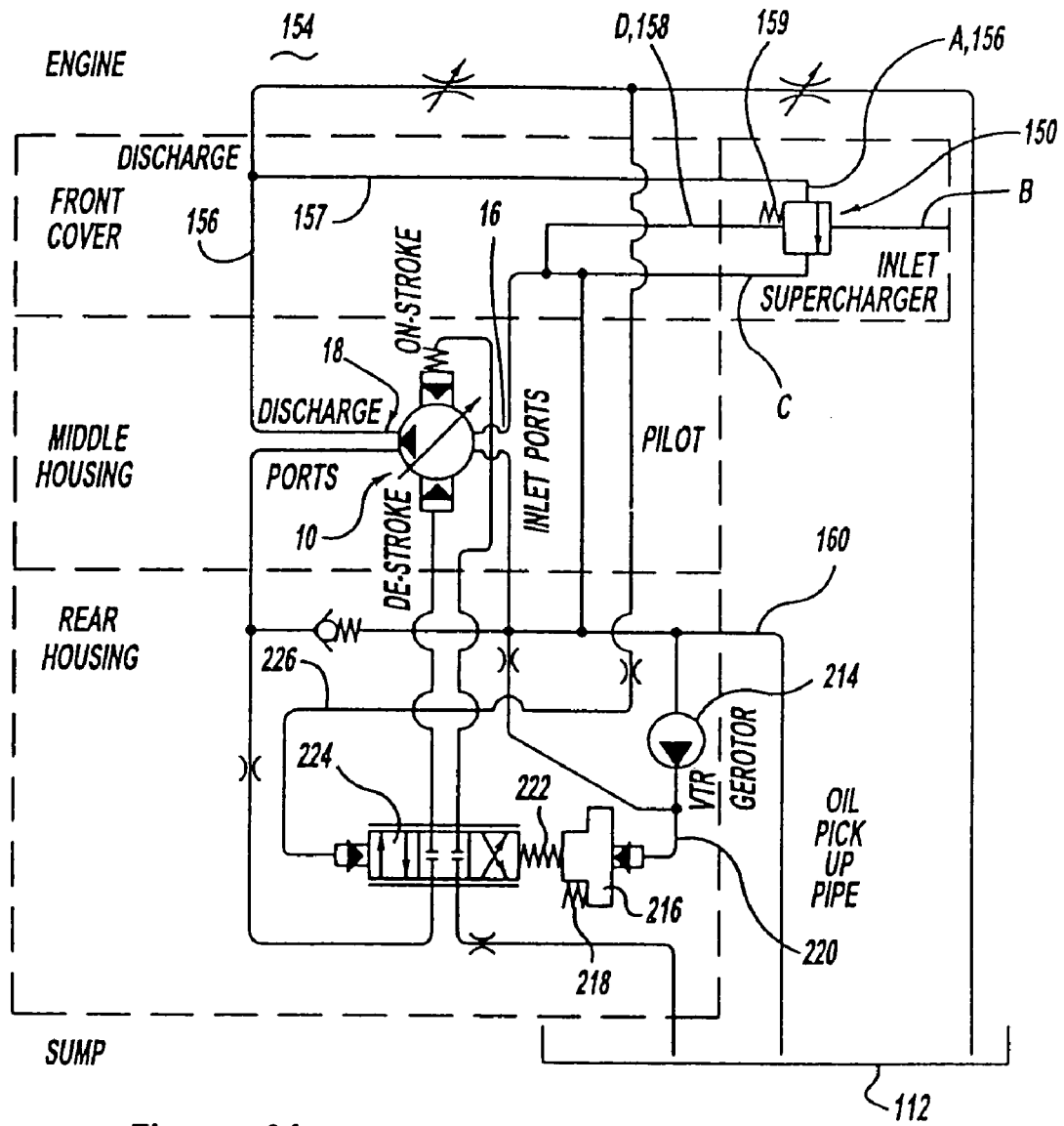
FIG. 9A is a schematic representation of a hydraulic circuit of FIG. 9 which includes an engine speed regulated variable target valve.
Figure 9B:
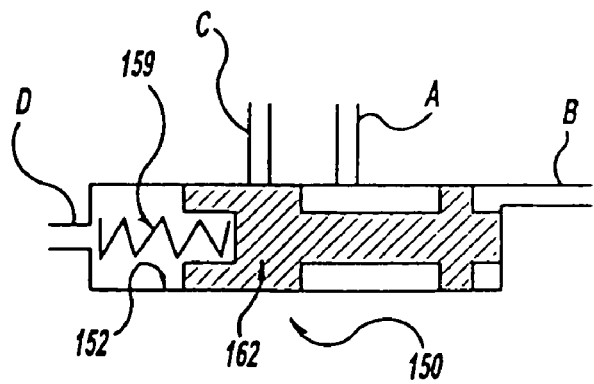
FIG. 9B is a schematic representation of a cross-section of the anti-cavitation valve of FIG. 9A.

FIGS. 9A and 9B provide the same structure as FIG. 8A, however, the inlet supercharger valve 150 is shown for charging the inlet port to help prevent cavitation at high pump speeds in response to suction pressure. Thus, excess velocity energy from the gerotor pump going across restriction 232 is used for assisting charging the inlet. This differs from the embodiment of FIG. 9, which uses discharge pressure as an indication of possible suction problems. Thus, in this embodiment, both the gerotor pump and the valve 150 are used to supercharge the inlet. However, one or the other of these systems could alternatively be used to supercharge the inlet. Line B is connected to atmospheric pressure. The inlet supercharger valve is inoperative at low speeds, but as a vacuum builds up in the inlet line D, the pressure differential opens valve 150 and directs discharge pressure from the pump back into the inlet port 16, through line C. This is further shown in FIG. 9B, wherein the line D vacuum compresses spring 159 at higher engine speeds and connects line A to line C for allowing flow at discharge pressure to accelerate into the inlet side through the supercharger valve. Thus, the pressure differential between lines D and B compresses spring 159 for activating the supercharger to the inlet of the pump.

Figure 11:
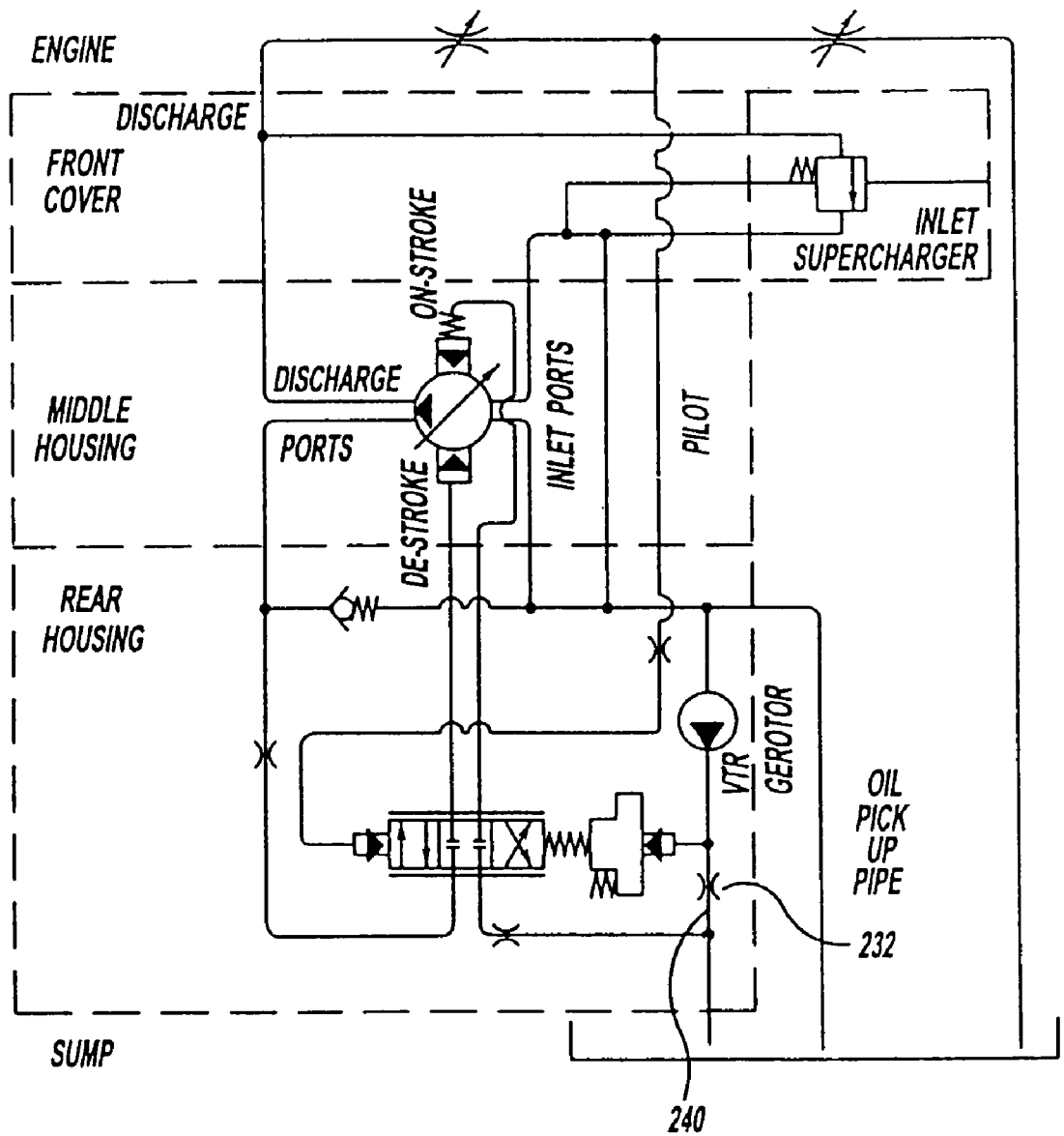
FIG. 11 is a hydraulic schematic similar to FIG. 9A but showing a gerotor pilot output is connected to the oil sump.

With reference now to FIG. 11, the system is similar to that shown in FIG. 9, with the exception that the output of the gerotor is merely sent to the sump along line 240, with restriction 232 in place on line 240.

Figure 12:
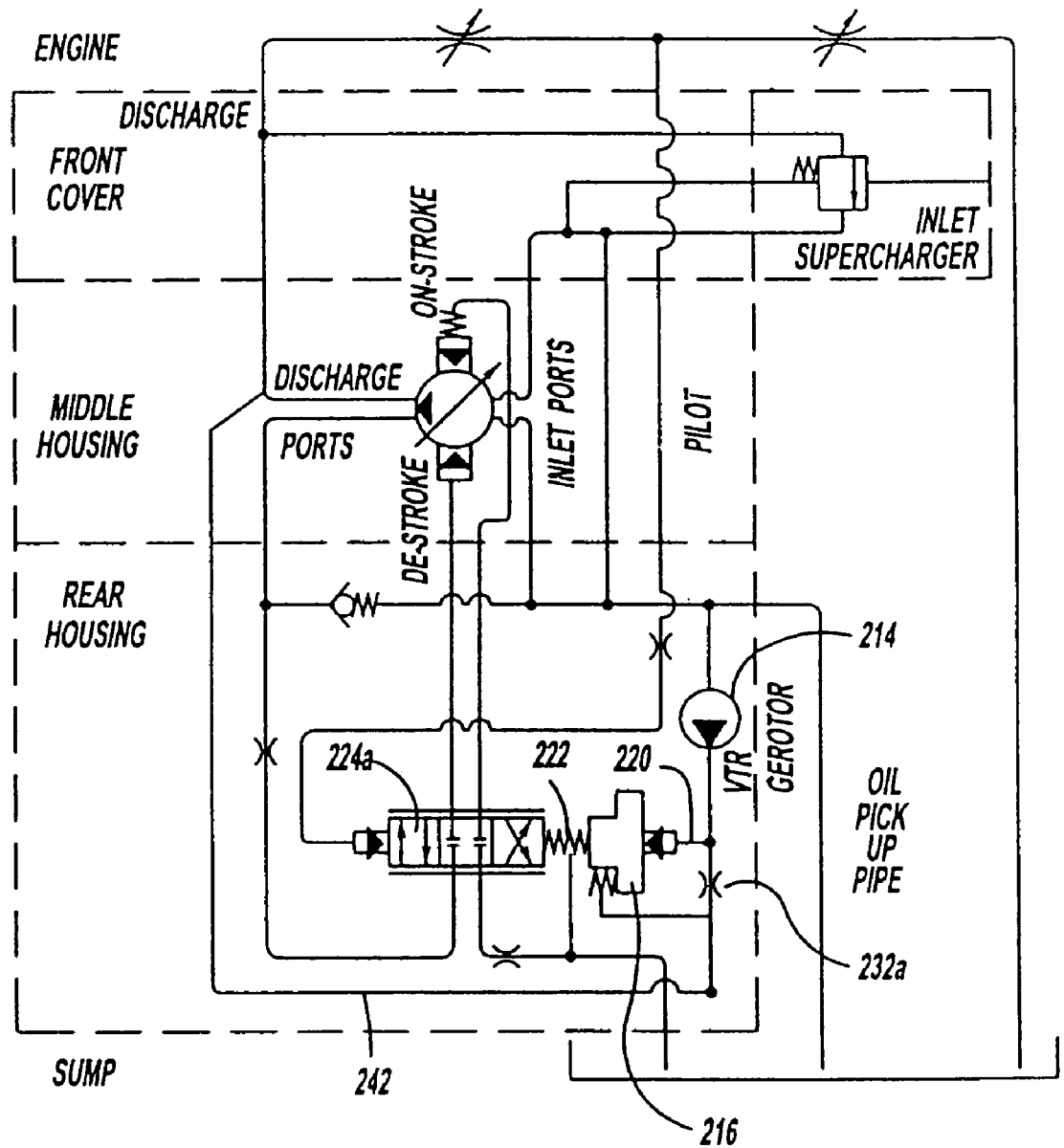
FIG. 12 is a hydraulic schematic similar to FIG. 9A, however, the engine oil regulation system includes an output from the gerotor pump to the discharge port, where the differential in pressure between the gerotor output and the vane pump output are used for controlling the targeting of the variable target flow control valve.

In FIG. 12, the operation is similar to that set forth in FIG. 9A again, however, the movement of piston 216 is governed by the pressure differential across orifice 232a and the calibrated line 220 from the gerotor pump. The line 242 is connected to the discharge outlet. In this manner, oil flow from the pump 214 is used normally in the engine oil pressure circuit.

Figure 13:
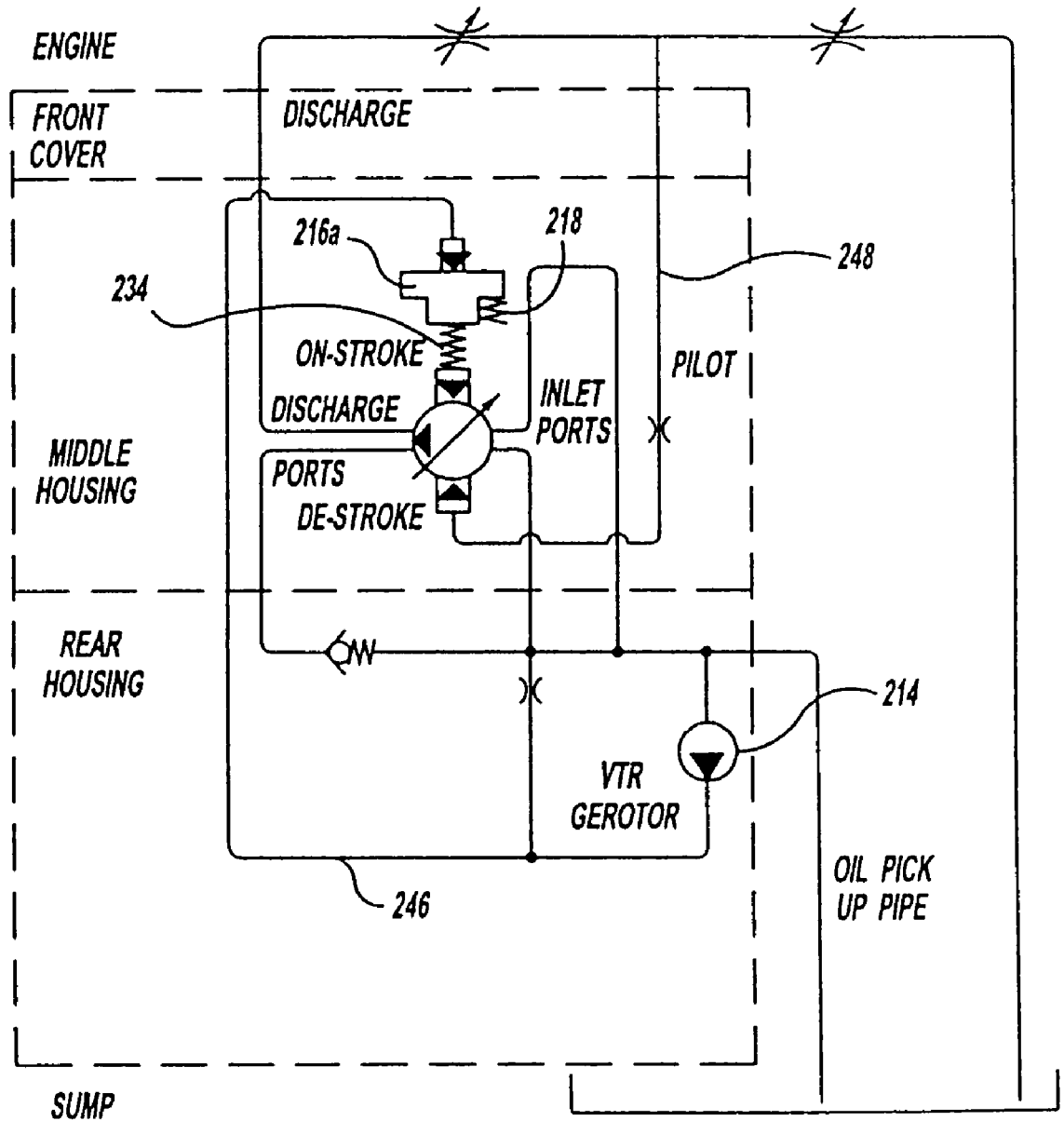
FIG. 13 is a hydraulic schematic showing engine speed controlled variable target regulation without a flow control valve.

FIG. 13 shows an embodiment of the present invention wherein the control piston 216a serves as a variable target device which acts directly on the spring 234 of the main variable displacement pump to provide direct targeting input to position piston 216a. Thus, the position of piston 216a sets the target. In this embodiment, the calibrated output of the gerotor exits along line 246 to actuate the piston 216a, and the pilot pressure line from the engine oil pressure circuit 248 is connected to the de-stroke side of the variable displacement pump. This direct pilot arrangement is somewhat simpler in that the variable pressure on spring 234 acts against the on-stroke piston, providing direct targeting based on output of the pump. Pressure 248 applied to de-stroke the pump to reduce displacement of the pump is opposed by spring 234. Gerotor 214 output is applied to 216a to increase or decrease the compression of spring 234. This varies the pressure at which displacement reduction will start. Therefore, as engine speed increases, the piston 216a puts more pressure on the spring 234 and, therefore, this increase the amount of pressure necessary for the circuit 248 to reduce displacement of the pump.

Figure 14:
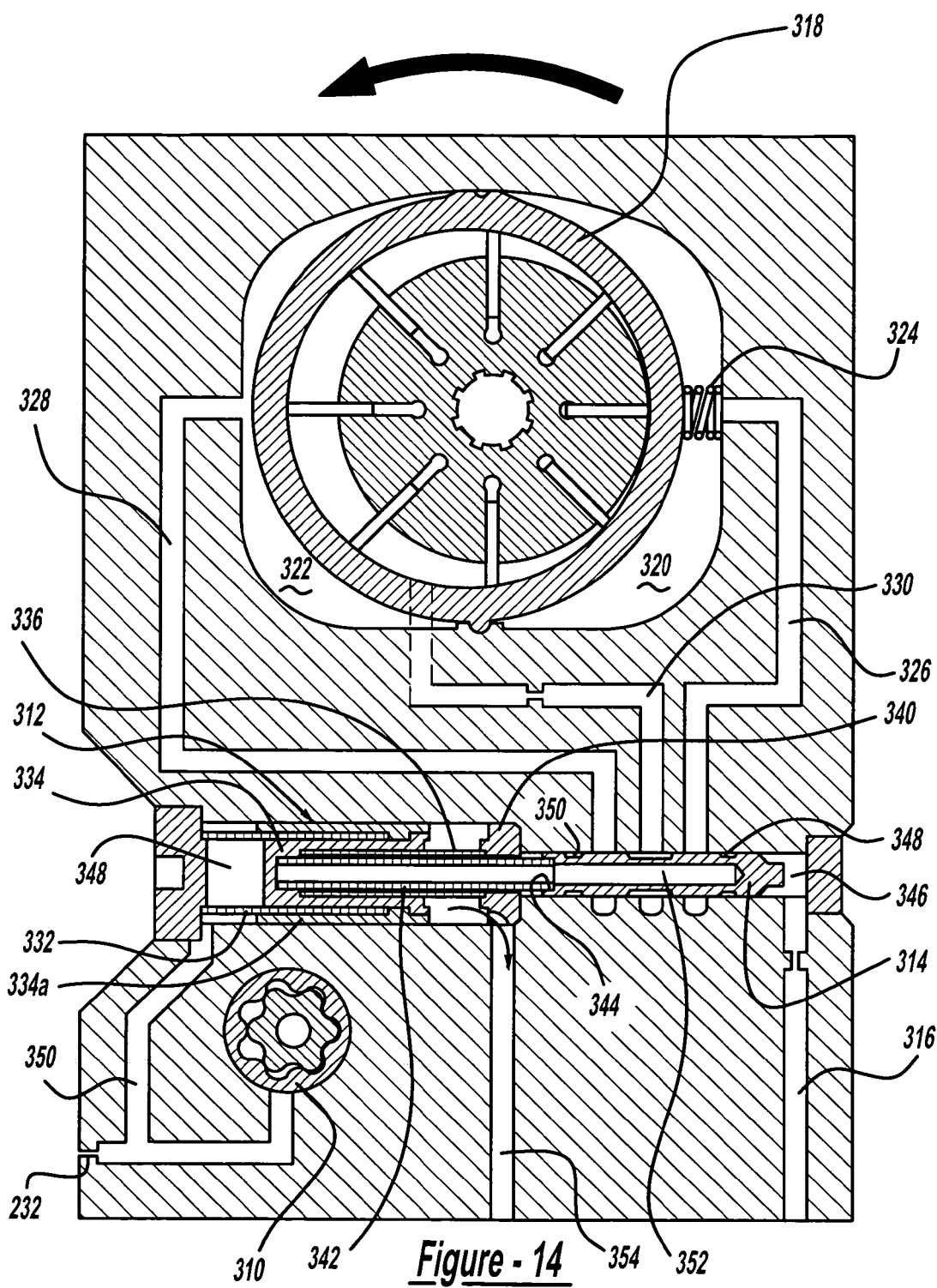
FIG. 14 is a sectional view of an embodiment significant to FIG. 11 of the present invention using variable target control with hydraulic control pressures acting directly on the eccentric ring.

FIG. 14 shows a sectional view of a pump body in accordance with the present invention, such as that shown generally in FIG. 11. In FIG. 14, an alternate embodiment of a variable target piston is shown. In this embodiment, a gerotor pump 310 acts in conjunction with a variable target piston assembly 312, which includes outer portion 334a and inner portion 334, which acts as one for moving a flow control valve 314 which is hydraulically connected to the oil pressure circuit of the engine 316. Actuation of the valve 314 moves the eccentric ring 318 of the pump by filling or exhausting the control chambers 320 and 322. The eccentric ring 318 is biased toward a full displacement position by way of spring 324. Chamber 320 is connected to a displacement increasing hydraulic line 326 and chamber 322 is connected to a displacement decreasing line 328. Additionally, discharged flow from the vane pump is routed to the valve by way of line 330 for providing hydraulic control pressure to chambers 322 and 320. Target piston 312 includes a preload spring 332 that preloads the piston assembly 312 toward the valve 314. A second spring 336 is grounded against spacer 340 for biasing piston assembly 312 against spring 332. Actuation spring 342 is grounded against the piston assembly 312 on a first side and acts against a receiving area 344 of the valve 314. A valve actuation chamber 346 biases the valve 314 towards movement in the direction toward the piston assembly 312 where as pressure from the gerotor pump is input into chamber 348 by way of line 350 for compressing the springs 342 and 336 to urge the valve 314 in the opposite direction. The addition of the third control spring 332 (relative to other embodiments) gives a different target pressure versus engine speed characteristics at low speeds than the other embodiments. As the speed increases, the gerotor pressure along with spring compression from spring 342 on the valve 314 sets the predetermined desired target of the valve 314. Feedback pressure from the engine oil circuit entering chamber 346 moves valve 314 to achieve the desired target oil pressure. Thus, the valve targets to the oil pressure set by the pressure of the output of the gerotor pump or the spring 342 and the engine circuit oil pressure by movement of the 4-way spool valve 314. The spool valve, when moving towards chamber 346, increases the displacement of the pump and when the oil pressure from the engine oil pressure input gets greater than the target, the spool valve 314 is moved against spring 342 towards the piston 312, which actuates the valve 314 to the displacement reducing line until the correct target pressure is obtained and the valve is positioned in the manner as shown in the drawing, in the neutral position. Passages 348 and 350 allow for exhaust from either the displacement reducing line or displacement increasing line into chamber 352 that exhausts through passageway 354. In this embodiment, initial preloaded spring 332 gives a higher target pressure at the low end of engine speed.

Figure 15:
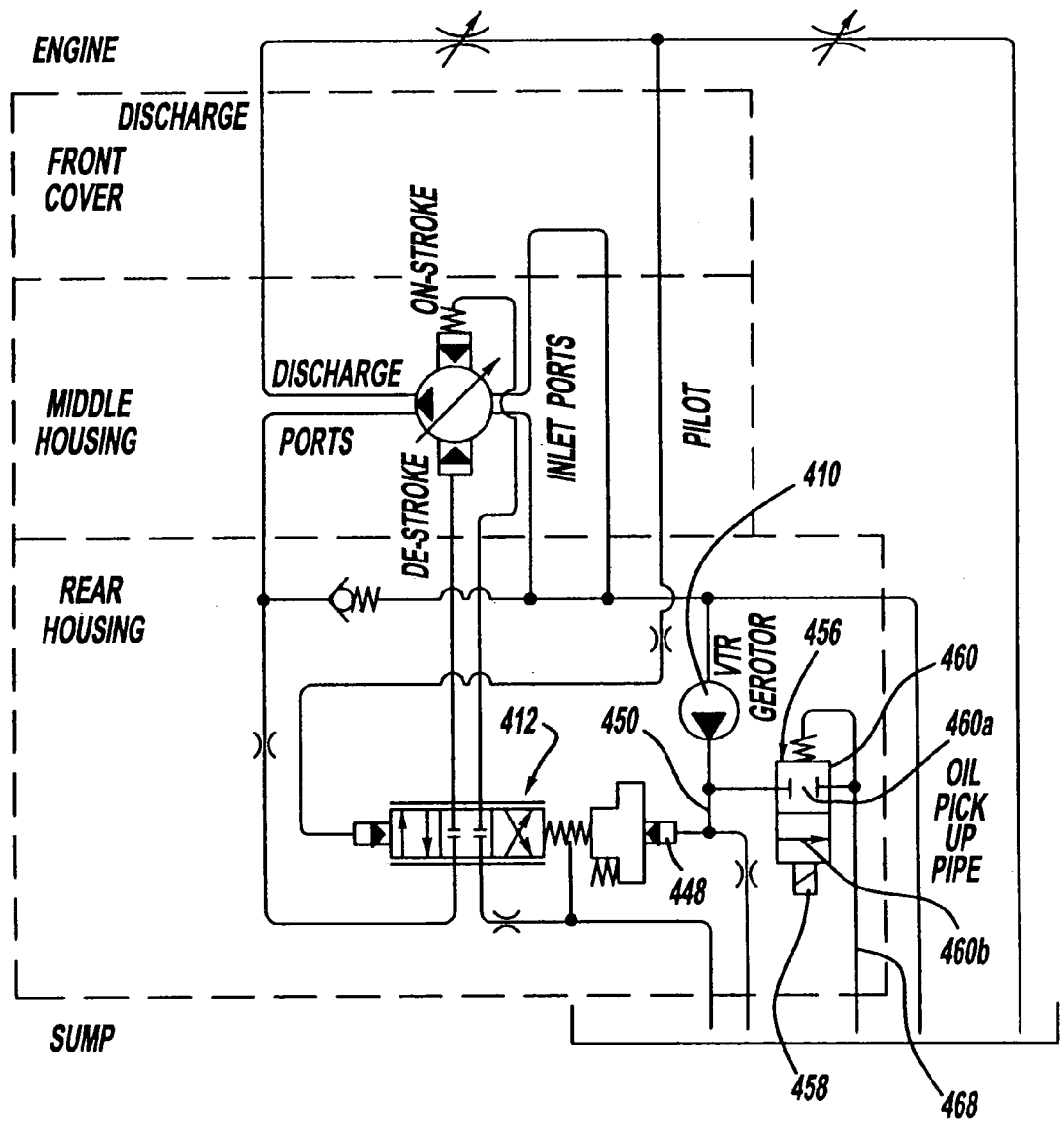
FIG. 15 is a hydraulic schematic of an alternate embodiment of the present invention, which is similar to FIGS. 4 and 14 without an inlet cavitation device but which includes a solenoid operated valve for metering gerotor pump output pressure.

In accordance with FIG. 15, like elements shown in FIG. 14 are illustrated therein by numbers differing from FIG. 14 by 100.

In the embodiment of FIG. 15, a solenoid generally indicated at 456 is used to meter flow from the output line 450 of gerotor 410. Solenoid valve 456 includes a solenoid portion 458 and a valve portion 460. The valve 456 is a two-position valve that has an off position 460 and a valve to sump position 460b. Thus, if it is determined that less gerotor pressure in chamber 448 is desired, the solenoid 458 can be actuated and gerotor pressure can be vented to the sump via line 462. This changes the regulation curve of the variable target piston control based on the output from the gerotor charging pressure versus speed characteristics of the gerotor pump. Thus, in this embodiment, activating the valve based on predetermined engine conditions provides for a second target curve that may be used. Based on these known conditions of the pump, the engine control unit can use either position of the solenoid valve to provide the desired target oil pressure.

Accordingly, the pump system of the present invention incorporates many features which facilitate the design and operation of the pump, enable vastly improved control over the pump operating parameters and output, and improve overall pump performance and efficiency. Desirably, the vane pump of the invention can meet the various requirements of lubrication for internal combustion engines at all speeds. Of course, the vane pump may also be utilized in power transmission and other fluid distribution applications.

Finally, while preferred embodiments of the invention have been described in some detail herein, the scope of the invention is defined by the claims that follow. Modifications of and applications for the inventive pump that are entirely within the spirit and scope of the invention will be readily apparent to those skilled in the art.

What is claimed is:

1. A lubricant pumping system for providing lubrication of an apparatus having a variable speed rotating shaft and an oil pressure circuit, comprising:
   a variable displacement pump which is variably adjustable in response to a control input;
   a fixed displacement pump operably connected to said variable speed rotating shaft, the output of said fixed displacement pump providing an actuation signal characteristic of a speed of said shaft for varying the displacement of said variable displacement pump in response to the speed of said shaft;
   a controllable valve for varying the resistance to the output of said fixed displacement pump for selectively adjusting the actuating signal characteristic of said fixed displacement pump; and
   wherein at least a portion of the output of said variable displacement pump is in fluid communication with the input of said fixed displacement pump;
   a first control piston is positioned in a bore, said bore being in fluid communication with said fixed displacement pump, said first control piston being positioned in said bore on a first side by a pressure from said control input and on a second side by a grounded spring, the position of said first control piston in said bore acting as a reference for the regulation system to provide a predetermined regulation target pressure in said oil pressure circuit.

2. The lubricant pumping system of claim 1, wherein said variable displacement pump and said fixed displacement pump are powered by the same rotating shaft.

3. The lubricant pumping system of claim 1, wherein said variable displacement pump is a vane pump with an eccentric ring for varying the displacement thereof in response to said control input.

4. The lubricant pumping system of claim 3, wherein the output of said fixed displacement pump has a calibrated flow resistance for providing a calibrated pressure signal indicative of the pump drive speed as said control input.

5. The lubricant pumping system of claim 1, wherein a multifunctional valve provides for varying the displacement of said variable displacement pump by directing pressurized fluid to an increasing displacement or a decreasing displacement actuator of said variable displacement pump in response to said first control piston acting on said multifunctional valve in a first direction, and a pressure input from said oil pressure circuit acting on said multifunctional valve in a second direction.

6. The lubricant pumping system of claim 5, wherein said multifunctional valve is a spool type valve having a biasing spring connected between said first control piston and said spool valve, said control piston compressing the biasing spring and biasing said spool valve to provide an increasing target regulation pressure in response to a control input from said fixed displacement pump, said spool valve having passages for directing a control flow of fluid to said increasing displacement and decreasing displacement actuators of said variable displacement pump, a control pressure from said oil pressure circuit acting on said spool valve against said biasing spring for seeking a predetermined target pressure.

7. The lubricant pumping system of claim 6, wherein said variable displacement pump is a vane pump which includes a movable eccentric ring for varying the displacement of said variable displacement pump, wherein the control flow of fluid provides said increasing displacement and decreasing displacement actuators and acts directly on said eccentric ring for moving said eccentric ring in either an increasing displacement or decreasing displacement control path depending on the target set by the position of said control piston and said biasing spring.

8. The lubricant pumping system of claim 6, wherein a pair of hydraulic pistons actuate the ring, wherein said multifunctional valve provides input through said pair of hydraulic pistons to move the eccentric ring for increasing or decreasing the displacement thereof, wherein movement of said eccentric ring is in response to changing target inputs from said fixed displacement pump and said oil pressure circuit so as to move said multifunctional valve for seeking the target regulation pressure set by said fixed displacement pump.

9. The lubricant pumping system of claim 7, wherein said eccentric ring is biased toward movement toward maximum displacement by a spring which is overcome by actuation pressure from said multifunctional valve for controlling displacement of said variable displacement pump.

10. The lubricant pumping system of claim 1, wherein a pre-loaded spring is provided for pre-biasing said control piston to provide a higher targeting pressure during initial engine start-up.

11. The lubricant pumping system of claim 1, further comprising a biasing spring connected to said first control piston and being compressed against a control actuator, the position of said first control piston creating a position reference for creating a target to which the displacement of said variable displacement pump is regulated.

12. The lubricant pumping system of claim 6, wherein said control flow to said control actuator is from a discharge line of said variable displacement pump.

13. The lubricant pumping system of claim 1, wherein a portion of the output of said fixed displacement pump is directed to an oil sump.

14. The lubricant pumping system of claim 6, wherein said controllable valve is used to selectively provide additional venting area of the output of said fixed displacement pump to the lubricant sump thereby reducing input pressure of said control input for providing a second variable target pressure characteristic as a function of speed to said spool valve.

15. The lubricant pumping system of claim 14, wherein operation of said controllable valve is controlled by a solenoid.

16. The lubricant pumping system of claim 15, wherein the solenoid controlled valve vents to the lubricant sump.

* * * * *